United States Patent [19]

McRoberts

[11] Patent Number: 4,598,372
[45] Date of Patent: Jul. 1, 1986

[54] APPARATUS AND METHOD OF SMOOTHING MAPS COMPRESSED IMAGE DATA

[75] Inventor: Louis A. McRoberts, Scottsdale, Ariz.

[73] Assignee: Motorola, Inc., Schaumburg, Ill.

[21] Appl. No.: 566,258

[22] Filed: Dec. 28, 1983

[51] Int. Cl.$^4$ .................. G06F 15/353; H04N 5/14; H04N 1/41
[52] U.S. Cl. .................... 364/518; 358/133; 358/260; 364/514; 382/56
[58] Field of Search ............... 364/514, 518, 521, 900; 358/133, 160, 166, 167, 260; 382/56

[56] References Cited

U.S. PATENT DOCUMENTS

| | | | |
|---|---|---|---|
| 4,034,194 | 7/1977 | Thomas et al. | 364/900 |
| 4,323,974 | 4/1982 | Sekigawa | 358/166 X |
| 4,355,337 | 10/1982 | Sekigawa | 358/260 X |
| 4,365,273 | 12/1982 | Yamada et al. | 358/260 |
| 4,368,462 | 1/1983 | Crawley | 358/260 X |
| 4,398,256 | 8/1983 | Nussmeier et al. | 358/160 X |
| 4,437,121 | 3/1984 | Taylor et al. | 358/160 |
| 4,446,484 | 5/1984 | Powell | 358/167 X |
| 4,450,483 | 5/1984 | Coviello | 358/166 |
| 4,463,381 | 7/1984 | Powell et al. | 358/167 X |
| 4,506,382 | 3/1985 | Hada et al. | 358/166 X |

OTHER PUBLICATIONS

LaBonte: Two-Dimensional Image Coding by Micro-Adaptive Picture Sequencing, SPIE, vol. 119, Applications of Digital Image Processing, pp. 99-106, Aug. 1977.
LaBonte et al.: Adaptive Decompression, MAPS Image Compression, RADC, Mar. 1980, final report on F30602-C-78-0253.
Hall et al.: Real Time Image Enhancement Using 3×3 Pixel Neighborhood Operator Functions, Optical Engineering, May/Jun. 1980, vol. 19, No. 3, pp. 421/424.

Primary Examiner—Felix D. Gruber
Attorney, Agent, or Firm—Eugene A. Parsons

[57] ABSTRACT

MAPS compressed image data is arranged symmetrically so that it can be stored in a substantially reduced memory and operated on for smoothing with substantially less components. A serial and a parallel design are disclosed, both of which have substantially reduced memories and a reduced number of stages for processing of the surround areas.

9 Claims, 77 Drawing Figures

FIG-3
CENTRAL BLOCK
☐ TARGET PIXEL

FIG-3A
CENTRAL BLOCK

FIG-8
SURROUND AREA ID LEVEL 2

FIG-9
PYRAMID WEIGHTING LEVEL 2 3X3 WINDOW

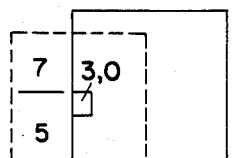 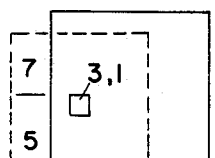 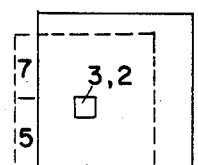 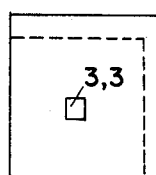
M  N  O  P
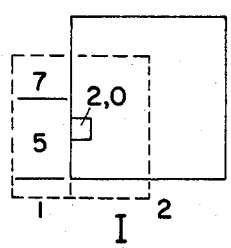 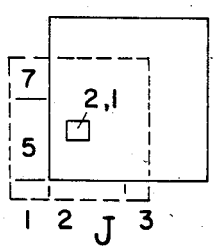 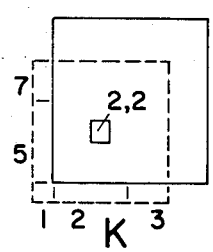 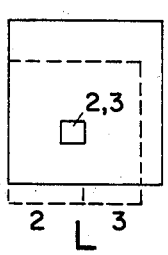
I  J  K  L
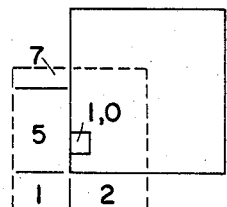 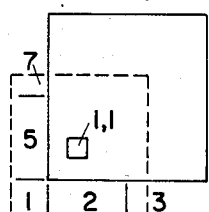 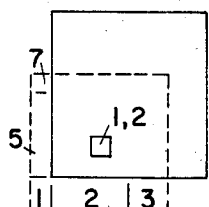 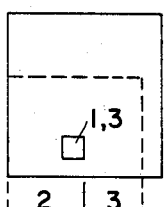
E  F  G  H
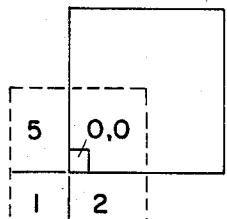 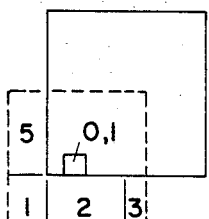 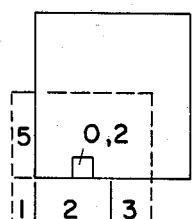 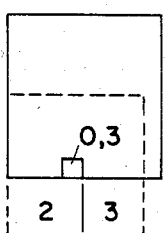
A  B  C  D
FIG-4

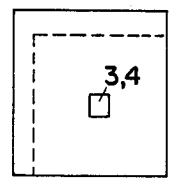 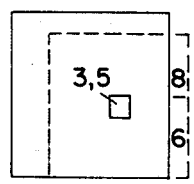 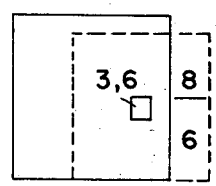 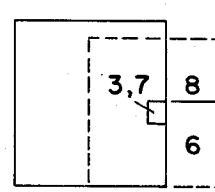
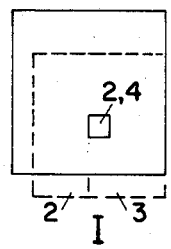 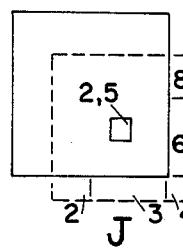 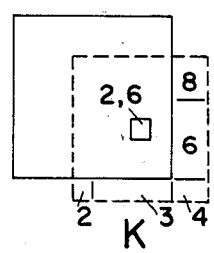 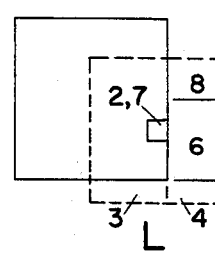
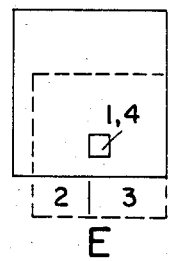 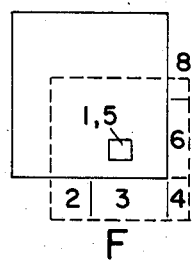 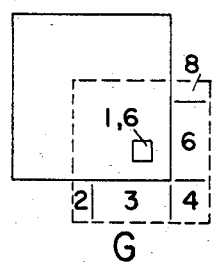 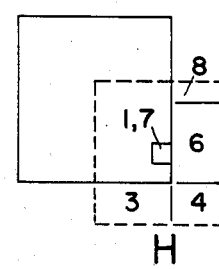
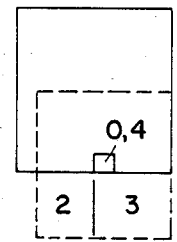 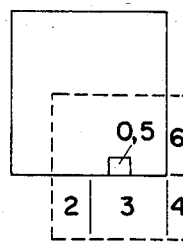 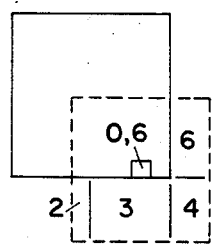 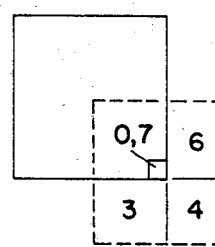
FIG. 5

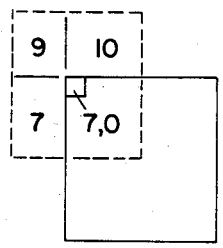 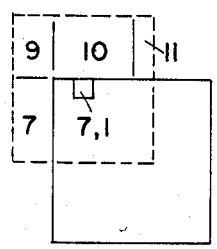 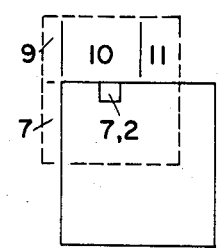 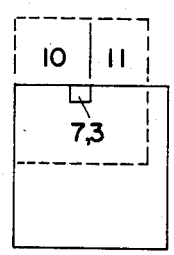
M  N  O  P
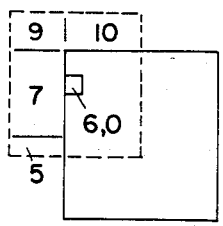 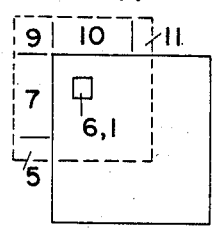 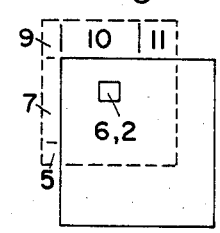 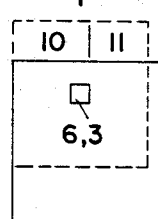
I  J  K  L
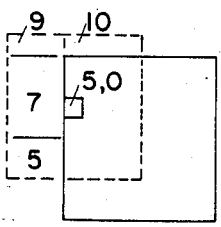 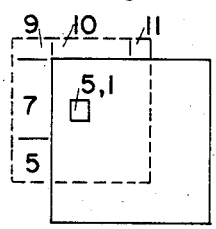 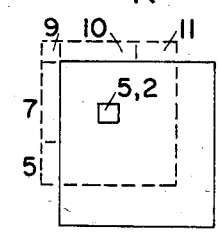 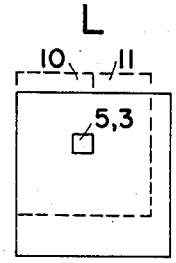
E  F  G  H
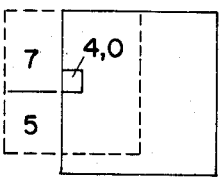 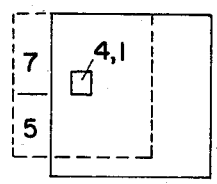 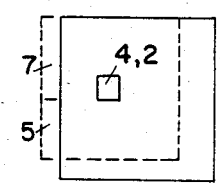 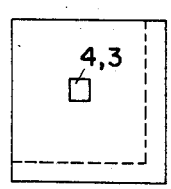
A  B  C  D
FIG. 6

SURROUND AREA ID-LEVEL 4

| 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|
| 1 | 2 | 2 | 2 | 2 | 2 | 2 | 2 | 2 | 2 | 2 | 2 | 2 | 2 | 1 |
| 1 | 2 | 3 | 3 | 3 | 3 | 3 | 3 | 3 | 3 | 3 | 3 | 3 | 2 | 1 |
| 1 | 2 | 3 | 4 | 4 | 4 | 4 | 4 | 4 | 4 | 4 | 3 | 3 | 2 | 1 |
| 1 | 2 | 3 | 4 | 5 | 5 | 5 | 5 | 5 | 5 | 4 | 3 | 2 | 1 |   |
| 1 | 2 | 3 | 4 | 5 | 6 | 6 | 6 | 6 | 5 | 4 | 3 | 2 | 1 |   |
| 1 | 2 | 3 | 4 | 5 | 6 | 7 | 7 | 7 | 6 | 5 | 4 | 3 | 2 | 1 |
| 1 | 2 | 3 | 4 | 5 | 6 | 7 | 8 | 7 | 6 | 5 | 4 | 3 | 2 | 1 |
| 1 | 2 | 3 | 4 | 5 | 6 | 7 | 7 | 7 | 6 | 5 | 4 | 3 | 2 | 1 |
| 1 | 2 | 3 | 4 | 5 | 6 | 6 | 6 | 6 | 6 | 5 | 4 | 3 | 2 | 1 |
| 1 | 2 | 3 | 4 | 5 | 5 | 5 | 5 | 5 | 5 | 5 | 4 | 3 | 2 | 1 |
| 1 | 2 | 3 | 4 | 4 | 4 | 4 | 4 | 4 | 4 | 4 | 4 | 3 | 2 | 1 |
| 1 | 2 | 3 | 3 | 3 | 3 | 3 | 3 | 3 | 3 | 3 | 3 | 3 | 2 | 1 |
| 1 | 2 | 2 | 2 | 2 | 2 | 2 | 2 | 2 | 2 | 2 | 2 | 2 | 2 | 1 |
| 1 | 1 | 1 | 1 | 1 | 1 | 1 | 1 | 1 | 1 | 1 | 1 | 1 | 1 | 1 |

PIRAMID WEIGHTING LEVEL-4
15 X 15 WINDOW

FIG_13

APPARATUS AND METHOD OF SMOOTHING MAPS COMPRESSED IMAGE DATA

BACKGROUND OF THE INVENTION

Micro-adaptive picture sequencing (MAPS), a computationally-efficient contrast-adaptive variable-resolution digital image coding technique is described in some detail in two reference articles listed below:
1. LaBonte, A. E., "Two Dimensional Image Coding By Micro-Adaptive Picture Sequencing", Proceedings of the Society of Photo-Optical Instrumentation Engineers, Volume 119, Applications of Digital Image Processing, pp 99–106, 1977; and
2. LaBonte, A. E. and T. E. Rosenthal, "MAPS Image Compression, RADC, March 1980, Final Report on F30602-C-78-0253".

These articles describe the MAPS algorithms for compression and decompression of video data. The algorithms are designed so that both compression and decompression involve only integer operations with no multiplies or explicit divides. In the "standard" digital encoding of an image, the scene is partitioned into a grid of equi-sized pixels and an intensity value is given sequentially for each element. Thus, only the intensity data is explicit. The resolution and position data are implicit. MAPS departs from standard matrix encoding of the image by making the resolution explicit. This is done at a micro level and element size can vary from pixel to pixel. This process is organized in such a way that the MAPS element positions remain implicit. Thus, compression is achieved by replacing a large amount of intensity data with a smaller amount of explicit resolution information.

Because the image data is compressed by describing as large a square area as possible with a single piece of data, it is necessary to smooth, or blend, the edges of adjacent areas to restore the decompressed data to a high quality image. In the above identified articles the smoothing process is included in the algorithms but requires a large amount of processing equipment and time.

SUMMARY OF THE INVENTION

The present invention pertains to a method and apparatus for smoothing MAPS compressed image data wherein the data is arranged symmetrically so that coefficients for the surround areas are divided into a plurality of groups, with each group containing the information for at least two surround areas which are never accessed simultaneously, the information for each group is stored in a single memory and redundant symmetrical information is stored in a single memory to reduce the memory required and the amount of processing circuitry, the memories being accessed so that the specific coefficients provided are identified as to surround area or portion of the central block.

It is an object of the present invention to provide a new and improved method and apparatus for smoothing MAPS compressed image data.

It is a further object of the present invention to provide a new and improved method and apparatus of smoothing MAPS compressed image data which greatly reduces the amount of apparatus required and the time for processing the data.

These and other objects of the present invention will become apparent to those skilled in the art upon consideration of the accompanying specification, claims and drawings.

BRIEF DESCRIPTION OF THE DRAWINGS

Referring to the drawings:
FIG. 1 represents a 16 pixel by 16 pixel matrix of MAPS compressed data;
FIG. 2 illustrates level 3, pyramid weighting with a 7 pixel by 7 pixel window;
FIG. 3 illustrates an 8 pixel by 8 pixel matrix, level 3 central block and surround area ID's;
FIG. 3A illustrates the window of FIG. 2 overlaid on the central block of FIG. 3 with a (2,2) target pixel;
FIGS. 4, 5, 6 and 7 illustrates the ID's and surround areas for pixels (0,0) A through (7,7) P of the central block of FIG. 3;
FIG. 8 is similar to FIG. 3 for a 4 pixel by 4 pixel matrix, level 2 central block;
FIG. 9 is similar to FIG. 2 for a level 2, pyramid weighting with a 3 pixel by 3 pixel window.

DESCRIPTION OF THE PREFERRED EMBODIMENTS

Figure 7:
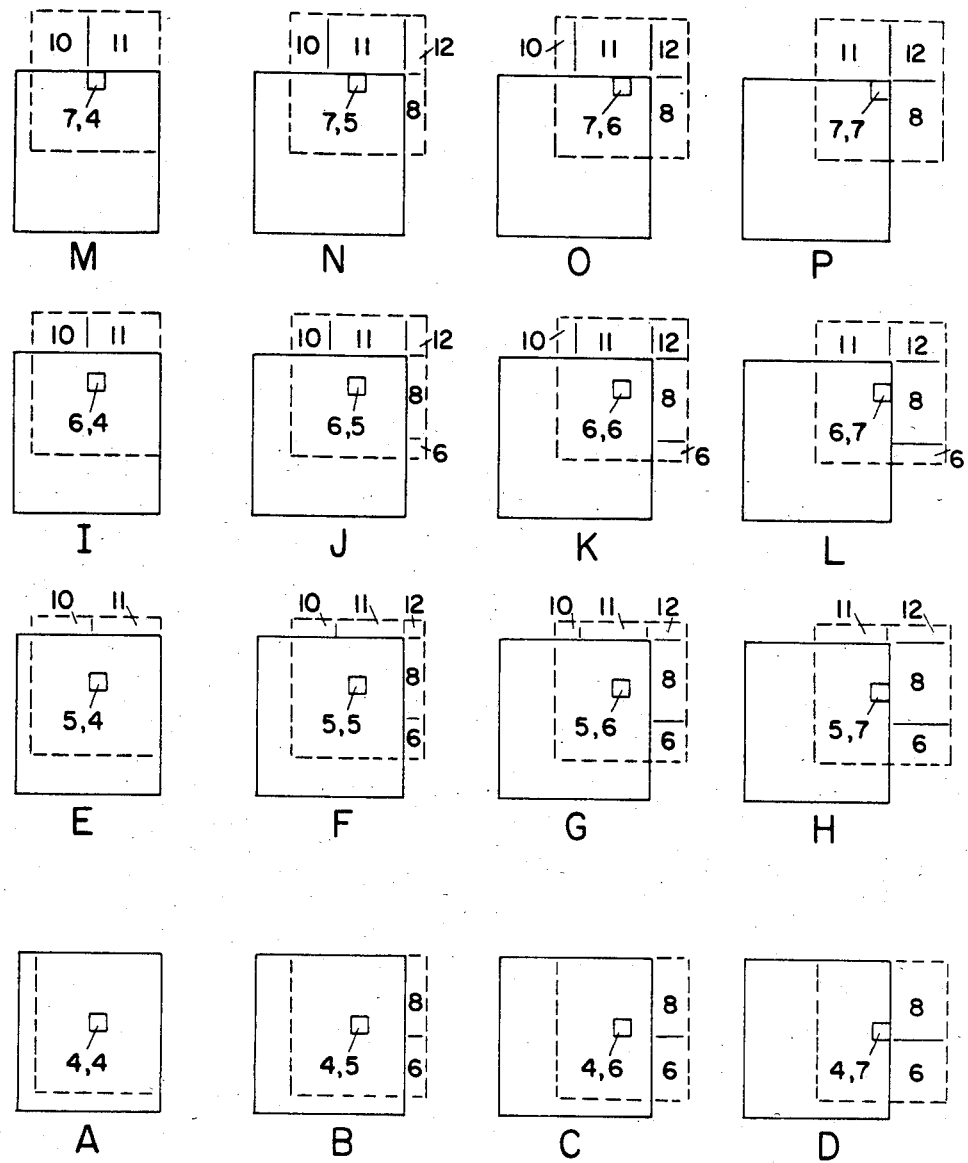

FIG. 1 is a hypothetical example to illustrate the operation of the compression algorithm. An image is illustrated in FIG. 1, which is divided into a 16 pixel by 16 pixel matrix. The area represented could be, for example, 16 range cells (rows) by 16 azimuth cells (columns) as used in a radar presentation. The complete presentation would contain additional rows of data, up to 6400 for some radar applications, but only a 16 by 16 matrix (subframe) is operated on at any one time in the MAPS algorithm. The numbers in each of the pixels indicates the level of compression and is used throughout the figure to simplify the description. A zero indicates no compression with the compression progressing from 1 through 4, 4 being a single level for the entire 16 by 16 matrix. A compression level of 1 indicates a 2 pixel by 2 pixel square area having a relatively constant contrast and, therefore, represented by a single piece of data, a level of 2 indicates a 4 pixel by 4 pixel square area having a constant contrast and represented by a single piece of data and a level of 3 indicates an 8 pixel by 8 pixel square area having a relatively constant contrast and represented by a single piece of data. Thus, in the compression a single piece of data including the compression level and video information can represent from 1 pixel (level 0) to 256 pixels (a level 4).

In the smoothing operation, basically, the pixels at the edge of an area, such as one of the level 3 areas in FIG. 1, are altered slightly to more closely match the adjacent pixels in the adjacent areas so that the area being smoothed more closely blends into the surrounding areas. Data from the surrounding areas is used to smooth a target pixel only if the level of the surrounding area is greater than or equal to the level of the pixel being smoothed minus one. Table I below shows which surround levels are allowed for each central level and the window size of the weighting function.

TABLE I

| CENTRAL LEVEL | ALLOWED SURROUND LEVEL | WINDOW SIZE |
|---|---|---|
| 0 | None | |
| 1 | 0, 1, 2, 3, 4 | 1 × 1 |
| 2 | 1, 2, 3, 4 | 3 × 3 |
| 3 | 2, 3, 4 | 7 × 7 |
| 4 | 3, 4 | 15 × 15 |

In the following description a central block of level 3 is utilized and it is then shown that the same requirements can be used for levels 2 and 4. Since level 0 is a single pixel with high contrast it obviously cannot be smoothed. Further, level 1 contains 4 pixels with relatively high contrast which again is not smoothed because the window size is one pixel.

A 7 pixel by 7 pixel convolution window using pyramid weighting is illustrated in FIG. 2. Pyramid weighting was chosen to simplify the calculations; however, Gausian or Markov weighting functions can be used. In pyramid weighting for a 7 by 7 window the central pixel has a weight of 4, the pixels immediately adjacent the central pixel have a weight of 3, the pixels immediately adjacent those weighted 3 have a weight of 2 and the outside or peripheral pixels have a weight of 1. The purpose of the weighting function is to determine the effect that surround areas and the central block have on any specific pixel.

Referring to FIG. 3, a central block 8 pixels by 8 pixels is illustrated with the areas that surround the central block identified by numbers 1 through 12. In determining the weighting function, or value, of the surround areas and the central block the convolutional window of FIG. 2 is placed in overlying relationship on the central block and surrounding areas (illustrated in FIG. 3) so that the pixel havng the weight of 4 overlies the target pixel. The amount of the convolutional window of FIG. 2 lying in the central block and in each of the surrounding areas is then calculated by adding the weights of each of the pixels lying in the central block or the surrounding areas.

FIGS. 4 through 7 illustrate the placement of the convolutional window over each of the pixels in the central block. The target pixel is identified by the ID numbers 0,0 through 7,7. Matrix notation is used for the pixel identification, however, the rows are labeled from bottom to top. The pixels in the lower left hand quadrant of the central block are illustrated in FIG. 4; the pixels in the lower right hand quadrant are illustrated in FIG. 5; the pixels in the upper left hand quadrant are illustrated in FIG. 6; and the pixels in the upper right hand quadrant are illustrated in FIG. 7. The matrix notation identifying each pixel can be considered an address which will be generated by a 6 bit counter, as described in more detail presently. As can be seen from FIGS. 4 through 7, the convolutional window always covers part of the central block and two or more surround areas, except where it is placed over central locations (3,3), (3,4), (4,3), or (4,4).

Coefficients for the central block and surround areas are derived from FIGS. 2 and 3. Each coefficient is the sum of the values in the weighting function that overlap a surround area or the central area. Table II lists the values of the surround coefficients for surround areas of different sizes that include a corner element of the convolutional window, for example, see FIG. 4A where surround area 5 is a 3 pixel by 4 pixel size with a corner element and, therefore, has an identification number 24 and a value of 20. The ID column of Table II is a number assigned to each of the various sizes for convenience of this explanation. The values, or coefficients, are the sum of the elements (as illustrated in FIG. 2) in each of the weighting areas.

TABLE II

| SURROUND COEFFICIENTS LEVEL 3 CORNER PIXEL INCLUDED | | |
|---|---|---|
| Size | ID | Value |
| 1 × 1 | 1 | 1 |
| 1 × 2 | 2 | 2 |
| 1 × 3 | 3 | 3 |
| 1 × 4 | 4 | 4 |
| 2 × 2 | 12 | 5 |
| 2 × 3 | 13 | 8 |
| 2 × 4 | 14 | 11 |
| 3 × 3 | 23 | 14 |
| 3 × 4 | 24 | 20 |

Table III lists the values of the surround coefficients for areas that do not include a corner element of the convolutional window, for example, in FIG. 4E the area 5 has a 4 pixel by 3 pixel size and is assigned an identification number 32 with a value of 23.

TABLE III

| SURROUND COEFFICIENTS LEVEL 3 CORNER PIXEL NOT INCLUDED | | |
|---|---|---|
| Size | ID | Value |
| 4 × 1 | 30 | 4 |
| 4 × 2 | 31 | 12 |
| 4 × 3 | 32 | 23 |

Table IV lists the values of the central coefficients. Since the element having a weight of 4 is always placed over the target pixel it can be seen that all of the central areas contain the center element of weight 4 and, thus, the minimum size is 4 by 4. From Tables II through IV and FIGS. 4 through 7, Table V was constructed, which table lists each central (target) pixel, the ID of the central coefficient and the ID of the applicable surround coefficients.

TABLE IV

| CENTRAL COEFFICIENTS LEVEL 3 | | |
|---|---|---|
| Size | ID | Value |
| 4 × 4 | 1 | 30 |
| 4 × 5 | 2 | 39 |
| 4 × 6 | 3 | 46 |
| 4 × 7 | 4 | 50 |
| 5 × 5 | 5 | 51 |
| 5 × 6 | 6 | 60 |
| 5 × 7 | 7 | 65 |
| 6 × 6 | 8 | 71 |
| 6 × 7 | 9 | 77 |
| 7 × 7 | 10 | 84 |

TABLE V

SHOWS WHICH SURROUND DATA AND COEFFICIENTS ARE USED WITH EACH CENTRAL PIXEL FOR LEVEL 3

| Central Pixel Location | Central Pixel Coefficient ID | Surround Area | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| 00 | 1 | 23 | 24 | | | 24 | | | | | | | |
| 01 | 2 | 13 | 32 | 3 | | 14 | | | | | | | |
| 02 | 3 | 3 | 32 | 13 | | 4 | | | | | | | |
| 03 | 4 | | 24 | 23 | | | | | | | | | |
| 04 | 4 | | 23 | 24 | | | | | | | | | |

TABLE V-continued
SHOWS WHICH SURROUND DATA AND COEFFICIENTS ARE USED WITH EACH CENTRAL PIXEL FOR LEVEL 3

| Central Pixel Location | Central Pixel Coefficient ID | \multicolumn{12}{c}{Surround Area} |||||||||||| |
|---|---|---|---|---|---|---|---|---|---|---|---|---|---|
| | | 1 | 2 | 3 | 4 | 5 | 6 | 7 | 8 | 9 | 10 | 11 | 12 |
| 05 | 3 | | 13 | 32 | 3 | | 4 | | | | | | |
| 06 | 2 | | 3 | 32 | 13 | | 14 | | | | | | |
| 07 | 1 | | | 24 | 23 | | 24 | | | | | | |
| 10 | 2 | 13 | 14 | | | 32 | | 3 | | | | | |
| 11 | 5 | 12 | 31 | 2 | | 31 | | 2 | | | | | |
| 12 | 6 | 2 | 31 | 12 | | 30 | | 1 | | | | | |
| 13 | 7 | | 14 | 13 | | | | | | | | | |
| 14 | 7 | | 13 | 14 | | | | | | | | | |
| 15 | 6 | | 12 | 31 | 2 | | 30 | | 1 | | | | |
| 16 | 5 | | 2 | 31 | 12 | | 31 | | 2 | | | | |
| 17 | 2 | | | 14 | 13 | | 32 | | 3 | | | | |
| 20 | 3 | 3 | 4 | | | 32 | | 13 | | | | | |
| 21 | 6 | 2 | 30 | 1 | | 31 | | 12 | | | | | |
| 22 | 8 | 1 | 30 | 2 | | 30 | | 2 | | | | | |
| 23 | 9 | | 4 | 3 | | | | | | | | | |
| 24 | 9 | | 3 | 4 | | | | | | | | | |
| 25 | 8 | | 2 | 30 | 1 | | 30 | | 2 | | | | |
| 26 | 6 | | 1 | 30 | 2 | | 31 | | 12 | | | | |
| 27 | 3 | | | 4 | 3 | | 32 | | 13 | | | | |
| 30 | 4 | | | | | 24 | | 23 | | | | | |
| 31 | 7 | | | | | 14 | | 13 | | | | | |
| 32 | 9 | | | | | 4 | | 3 | | | | | |
| 33 | 10 | | | | | | | | | | | | |
| 34 | 10 | | | | | | | | | | | | |
| 35 | 9 | | | | | | | 4 | | 3 | | | |
| 36 | 7 | | | | | | | 14 | | 13 | | | |
| 37 | 4 | | | | | | | 24 | | 23 | | | |
| 40 | 4 | | | | | 23 | | 24 | | | | | |
| 41 | 7 | | | | | 13 | | 14 | | | | | |
| 42 | 9 | | | | | 3 | | 4 | | | | | |
| 43 | 10 | | | | | | | | | | | | |
| 44 | 10 | | | | | | | | | | | | |
| 45 | 9 | | | | | | | 3 | | 4 | | | |
| 46 | 7 | | | | | | | 13 | | 14 | | | |
| 47 | 4 | | | | | | | 23 | | 24 | | | |
| 50 | 3 | | | | | 13 | | 32 | | 3 | 4 | | |
| 51 | 6 | | | | | 12 | | 31 | | 2 | 30 | 1 | |
| 52 | 8 | | | | | 2 | | 30 | | 1 | 30 | 2 | |
| 53 | 9 | | | | | | | | | 4 | 3 | | |
| 54 | 9 | | | | | | | | | 3 | 4 | | |
| 55 | 8 | | | | | | | 2 | | 30 | 2 | 30 | 1 |
| 56 | 6 | | | | | | | 12 | | 31 | 1 | 30 | 2 |
| 57 | 3 | | | | | | | 13 | | 32 | | 4 | 3 |
| 60 | 2 | | | | | 3 | | 32 | | 13 | 14 | | |
| 61 | 5 | | | | | 2 | | 31 | | 12 | 31 | 2 | |
| 62 | 6 | | | | | 1 | | 30 | | 2 | 31 | 12 | |
| 63 | 7 | | | | | | | | | 14 | 13 | | |
| 64 | 7 | | | | | | | | | 13 | 14 | | |
| 65 | 6 | | | | | | | 1 | | 30 | 12 | 31 | 2 |
| 66 | 5 | | | | | | | 2 | | 31 | 2 | 31 | 12 |
| 67 | 2 | | | | | | | 3 | | 32 | | 14 | 13 |
| 70 | 1 | | | | | | | 24 | | 23 | 24 | | |
| 71 | 2 | | | | | | | 14 | | 13 | 32 | 3 | |
| 72 | 3 | | | | | | | 4 | | 3 | 32 | 13 | |
| 73 | 4 | | | | | | | | | | 24 | 23 | |
| 74 | 4 | | | | | | | | | | 23 | 24 | |
| 75 | 3 | | | | | | | | | 4 | 13 | 32 | 3 |
| 76 | 2 | | | | | | | | | 14 | 3 | 32 | 13 |
| 77 | 1 | | | | | | | | | 24 | | 24 | 23 |

Using the following definitions:

The output value for any pixel can be computed. For example, the value for pixel 02 is:

$$\text{Out}_{02} = \frac{D \cdot C_3 + DS_1 \cdot CS_3 + DS_2 \cdot CS_{32} + DS_3 \cdot CS_{13} + DS_5 \cdot CS_4}{C_3 + CS_3 + CS_{32} + CS_{13} + CS_4}$$

where:

D = data for the central area
Ci = coefficient for the central area (ID column from Table IV)
DSi = data for the surrounded area, i = 1 to 12
CSi = coefficient for the surround area (ID column from Table II or III)

Essentially, this equation multiplies the value, or coefficient, for each area adjacent to a target pixel times the data for that area to determine the weight that that area will have on the final value for the target pixel. Thus, to implement this equation, from the prior art, requires one multiplier and one read-only-memory (ROM) for each surround area and the central area. The ROM for each area contains the values of the coefficients for that area and is accessed by the central pixel location number. However, the present invention greatly reduces the number of multipliers and ROMs required and provides a simple and fast hardware implementation.

To better understand the implementation of the present invention, there are two observations that can be made about the symmetry of the information in Table V. The order of the surround coefficients when reading Table V from top (central pixel location 0,0) to bottom (central pixel location 7,7), left to right, is the same as reading the table from bottom to top and right to left. Also, the order of the central coefficients when read from top to bottom is the same as when read from bottom to top. Thus, central pixel 00 uses the same coefficients as pixel 77, pixel 01 uses the same coefficients as pixel 76, etc. This symmetrical arrangement is used to reduce the ROM size in the present embodiment from 64 to 32 words. The second observation is that Table V can be folded over between surround areas 6 and 7. That is, the output value for any pixel uses surround areas and coefficients one or 12 (or neither), but never both. The same is true for surround areas 2 or 11, 3 or 10, 4 or 9, 5 or 8 and 6 or 7. This observation is used to reduce the number of multipliers and ROMs from 13 (1 for each surround area and the central area) to 6, the number of adders from 24 to 10 and the ROM size from 64 to 32 words.

The reduction in ROM words and the remaining hardware is accomplished as follows. There are 6 ROMs, 1 programmed with the central coefficient. Two of the remaining 5 ROMs are programmed for surround areas 2 and 3 directly from Table V(A). One of the remaining ROMs is programmed for surround area 5 and includes the coefficients for surround area 8 in locations 15 to 17, 25 to 27 and 35 to 37, base 8. One of the remaining ROMs is programmed for surround area 6 and includes the coefficients for surround area 7 in locations 10 to 12, 20 to 22 and 30 to 32. The last ROM is programmed for surround area 1 and includes the coefficients for surround area 4 in locations 5 to 7, 15 to 17 and 25 to 27. This latter ROM also contains the coefficients for surround areas 9 and 12, or a total of 4 surround areas while the other ROMs contain coefficients for only 2 surround areas. It should be noted again that the two surround areas contained in each of the ROMs are never accessed simultaneously. That is, a review of FIGS. 4 through 7 will clearly show that in all instances only one surround area in each of the six ROMs is utilized for any central pixel.

As stated earlier, the pixel identification, which is also considered the address, is a 6 bit word generated by a counter, which will be described presently. The lower 5 bits of the central pixel address are used to address the above described ROMs. Bits 2 and 5 are used to select the appropriate surround areas as shown in Table VI. Table VI was developed from Table V. It should be noted from Table V that the pixel locations are not continuous but are arranged in groups of eight, that is from 00 to 07, from 10 to 17, from 20 to 27, etc, base 8. Thus, Table V(A) actually has 32 locations and Table V(B) has 32 locations. Counter outputs 00 to 37 (to the base 8) correspond to central pixel locations 00 to 37, as shown in Table V(A). However, counter outputs 40 to 77 (to the base 8) correspond to central pixel locations 77 to 40, as illustrated in Table V(B). This will be understood by one skilled in the art by remembering that 5 bits, from 00000 to 11111 represent 32 addresses or locations and at the 33rd address the lower 5 bits again become all zeros. Therefore, when the sixth or most significant bit of the counter is 0, the counter output is the central pixel location. However, when the most significant bit of the counter is 1, the central pixel coefficient location is the 1's complement of the low order 5 bits. Thus, the central pixel address is always the counter output. The ROM address is the low order five bits if the most significant bit is zero but is the 1's complement of the low order 5 bits if the most significant bit is a 1.

For example, if the central pixel location is 22, the counter output is 010010. It can be seen that bits 2 and 5 are both zero and referring to Table VI the appropriate surround areas are 1, 2, 3, 5 and 7. Referring to Table V(A) it will be seen that central pixel location 22 lists a central pixel coefficient of 8 and surround area coefficients of 1, 30, 2, 30 and 2. The values of these surround and central area coefficients can be obtained from Tables II, III and IV. These values are multiplied by the data for surround areas 1, 2, 3, 5 and 7 respectively and the central data.

If the counter output is 55, 101101, the ROM address is 10010, which is the same for central pixel 22 described above and the same coefficients will be used. From Table V(B) it can be seen that surround areas 12, 11, 10, 8 and 6 are selected. The surround areas are selected according to the central pixel address shown in Table VI.

TABLE VI

X = DON'T CARE. SURROUND AREA SELECTED BY ADDRESS BITS 5 AND 2 LEVEL 3

| Surround Area | Central Pixel Address | |
|---|---|---|
| | Bit 5 | Bit 2 |
| 1 | 0 | 0 |
| 4 | 0 | 1 |
| 9 | 1 | 0 |
| 12 | 1 | 1 |
| 2 | 0 | X |
| 11 | 1 | X |
| 3 | 0 | X |
| 10 | 1 | X |
| 5 | X | 0 |
| 8 | X | 1 |
| 6 | X | 1 |
| 7 | X | 0 |

The same series of steps can be performed to show that a central area of level 2 can be processed in a similar manner. FIGS. 8 and 9 illustrate the surround area ID and pyramid weighting for level 2 data. Tables VII and VIII show the surround and central coefficient values for the different sizes and the ID. Note that there is no distinction between surround areas with or without a corner pixel in the level 2 weighting. Table IX is similar to Table V and illustrates the central pixel and surround coefficients and IDs as well as the symmetry therebetween. A Table X, identical to Table VI, except that central pixel address bits 3 and 1 are used instead of 5 and 2, is used in conjunction with a 4 bit counter and addresses to the base 4, rather than to the base 8. ROMs for the level 2 coefficients require only 8 locations each, and may be programmed in the same manner as the ROMs for level 3. Thus, it is apparent that, with the exception of the different address bits to select the surround data and the contents of the ROM, the same hardware design can be used for levels 2 and 3.

TABLE VII

SURROUND COEFFICIENTS LEVEL 2

| Size | ID | Value |
|---|---|---|
| 1 × 1 | 1 | 1 |
| 1 × 2 | 2 | 2 |

TABLE VIII

CENTRAL COEFFICIENTS LEVEL 2

| Size | ID | Value |
|---|---|---|
| 2 × 2 | 1 | 5 |
| 2 × 3 | 2 | 7 |
| 3 × 3 | 3 | 10 |

TABLE IX

SHOWS WHICH SURROUND DATA AND COEFFICIENTS ARE USED WITH EACH CENTRAL PIXEL FOR LEVEL 2

| Central Pixel ID | Central Pixel Coefficient ID | Surround Coefficient | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| 00 | 1 | 1 | 2 | | | 2 | | | | | | | |
| 01 | 2 | | 2 | 1 | | | | | | | | | |
| 02 | 2 | | 1 | 2 | | | 2 | | | | | | |
| 03 | 1 | | | 2 | 1 | | 2 | | | | | | |
| 10 | 2 | | | | | 2 | | 1 | | | | | |
| 11 | 3 | | | | | | | | | | | | |
| 12 | 3 | | | | | | | | | | | | |
| 13 | 2 | | | | | 2 | 1 | | | | | | |
| 20 | 2 | | | | 1 | | 2 | | | | | | |
| 21 | 3 | | | | | | | | | | | | |
| 22 | 3 | | | | | | | | | | | | |
| 23 | 2 | | | | | | 1 | | 2 | | | | |
| 30 | 1 | | | | | | | 2 | | 1 | 2 | | |
| 31 | 2 | | | | | | | | | | 2 | 1 | |
| 32 | 2 | | | | | | | | | | | 1 | 2 |
| 33 | 1 | | | | | | | | 2 | | | 2 | 1 |

TABLE X

X = DON'T CARE. SURROUND AREA SELECTED BY ADDRESS BITS 3 AND 1

| Surround Area | Central Pixel Address | |
|---|---|---|
| | Bit 3 | Bit 1 |
| 1 | 0 | 0 |
| 4 | 0 | 1 |
| 9 | 1 | 0 |
| 12 | 1 | 1 |
| 2 | 0 | X |
| 11 | 1 | X |
| 3 | 0 | X |
| 10 | 1 | X |
| 5 | X | 0 |
| 8 | X | 1 |
| 6 | X | 1 |

TABLE X-continued

X = DON'T CARE. SURROUND AREA SELECTED BY ADDRESS BITS 3 AND 1

| Surround Area | Central Pixel Address Bit 3 | Bit 1 |
|---|---|---|
| 7 | X | 0 |

Figures 10, 11:
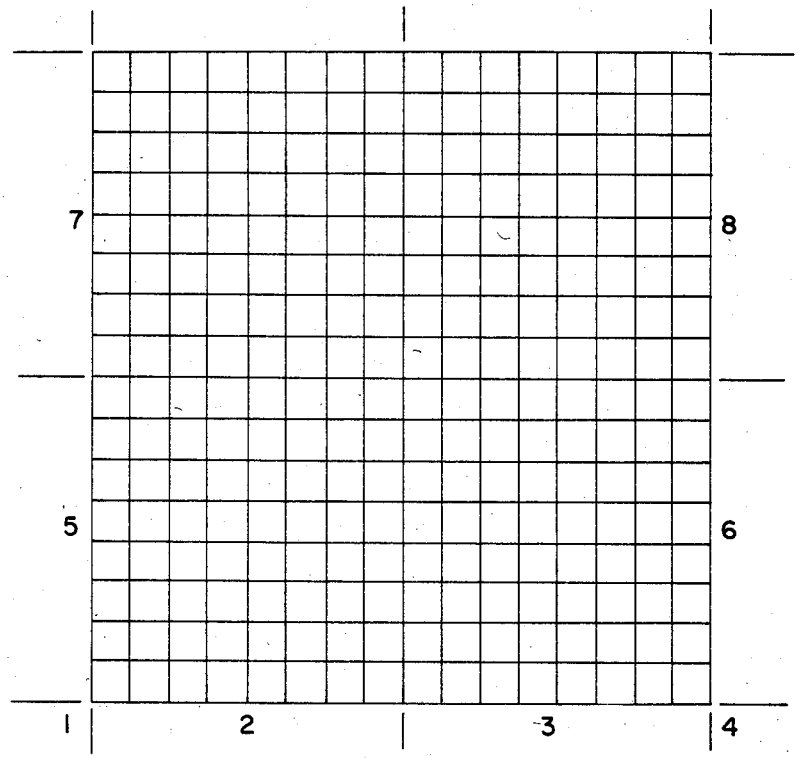
FIG. 10 is similar to FIGS. 2 and 9 for a level 4, pyramid weighting with a 15 pixel by 15 pixel window.
FIG. 11 is similar to FIGS. 3 and 8 for a 16 pixel by 16 pixel matrix, level 4 central block.

In a similar fashion, the series of steps performed for the central area of level 3 can be used for a central area at level 4. FIGS. 10 and 11 illustrate pyramid weighting and surround area ID for level 4 data. Tables XI through XV illustrate the values for the different coefficients, the ID and the size of the surround and central areas. Tables XIII, XIV and XV are for the cases where a corner element is not included in the surround areas. Table XVI, 8 pages long, shows the coefficients and surround areas and central coefficient needed to compute the output for each of the 256 pixels for level 4. It can be seen that this table has the same form as Table V and the symmetry is the same. A Table XVII, identical to Tables VI and X except for the address bits, shows the surround areas selected by address bits 7 and 3. For level 4, an 8 bit counter is needed so the central pixel locations are to the base 16. From Tables XVI and XVII and the previous observations about the symmetry of the tables, it can be seen that level 4 data can use the same basic hardware design as levels 2 and 3.

TABLE XI

SURROUND COEFFICIENTS LEVEL 4 CORNER PIXEL INCLUDED

| Size | ID | Value |
|---|---|---|
| 1 × 1 | 1 | 1 |
| 1 × 2 | 2 | 2 |
| 1 × 3 | 3 | 3 |
| 1 × 4 | 4 | 4 |
| 1 × 5 | 5 | 5 |
| 1 × 6 | 6 | 6 |
| 1 × 7 | 7 | 7 |
| 1 × 8 | 8 | 8 |
| 2 × 2 | 12 | 5 |
| 2 × 3 | 13 | 8 |
| 2 × 4 | 14 | 11 |
| 2 × 5 | 15 | 14 |
| 2 × 6 | 16 | 17 |
| 2 × 7 | 17 | 20 |
| 2 × 8 | 18 | 23 |
| 3 × 3 | 23 | 14 |
| 3 × 4 | 24 | 20 |
| 3 × 5 | 25 | 26 |
| 3 × 6 | 26 | 32 |
| 3 × 7 | 27 | 38 |
| 3 × 8 | 38 | 44 |
| 4 × 4 | 34 | 30 |
| 4 × 5 | 35 | 40 |
| 4 × 6 | 36 | 50 |
| 4 × 7 | 37 | 60 |
| 4 × 8 | 38 | 70 |
| 5 × 5 | 45 | 55 |
| 5 × 6 | 46 | 70 |
| 5 × 7 | 47 | 85 |
| 5 × 8 | 48 | 100 |
| 6 × 6 | 56 | 91 |
| 6 × 7 | 57 | 112 |
| 6 × 8 | 58 | 133 |
| 7 × 7 | 67 | 140 |
| 7 × 8 | 68 | 168 |

TABLE XII

CENTRAL COEFFICIENTS LEVEL 4

| Size | ID | Value |
|---|---|---|
| 8 × 8 | 1 | 204 |
| 8 × 9 | 2 | 239 |
| 8 × 10 | 3 | 272 |
| 8 × 11 | 4 | 302 |
| 8 × 12 | 5 | 328 |
| 8 × 13 | 6 | 349 |
| 8 × 14 | 7 | 364 |
| 8 × 15 | 8 | 372 |
| 9 × 9 | 9 | 281 |
| 9 × 10 | 10 | 320 |
| 9 × 11 | 11 | 355 |
| 9 × 12 | 12 | 385 |
| 9 × 13 | 13 | 409 |
| 9 × 14 | 14 | 426 |
| 9 × 15 | 15 | 435 |
| 10 × 10 | 16 | 365 |
| 10 × 11 | 17 | 405 |
| 10 × 12 | 18 | 439 |
| 10 × 13 | 19 | 466 |
| 10 × 14 | 20 | 485 |
| 10 × 15 | 21 | 495 |
| 11 × 11 | 22 | 450 |
| 11 × 12 | 23 | 488 |
| 11 × 13 | 24 | 518 |
| 11 × 14 | 25 | 539 |
| 11 × 15 | 26 | 550 |
| 12 × 12 | 27 | 530 |
| 12 × 13 | 28 | 563 |
| 12 × 14 | 29 | 586 |
| 12 × 15 | 30 | 598 |
| 13 × 13 | 31 | 599 |
| 13 × 14 | 32 | 624 |
| 13 × 15 | 33 | 637 |
| 14 × 14 | 34 | 651 |
| 14 × 15 | 35 | 655 |
| 15 × 15 | 36 | 680 |

TABLE XIII

| Size | ID | Value | TYPE 1 |
|---|---|---|---|
| 1 × 8 | 71 | 8 | Surround area starts |
| 2 × 8 | 72 | 24 | (or ends) on row (or |
| 3 × 8 | 73 | 47 | column) 1 (or 14) of |
| 4 × 8 | 74 | 76 | the central area. |
| 5 × 8 | 75 | 110 | |
| 6 × 8 | 76 | 148 | |
| 7 × 8 | 77 | 189 | |

TABLE XIV

| Size | ID | Value | TYPE 2 |
|---|---|---|---|
| 1 × 8 | 81 | 8 | Surround area starts |
| 2 × 8 | 82 | 24 | (or ends) on row (or |
| 3 × 8 | 83 | 48 | column) 2 (or 13) of |
| 4 × 8 | 84 | 79 | the central area. |
| 5 × 8 | 85 | 116 | |
| 6 × 8 | 86 | 158 | |
| 7 × 8 | 87 | 203 | |

TABLE XV

| Size | ID | Value | TYPE 3 |
|---|---|---|---|
| 1 × 8 | 91 | 8 | Surround area starts |
| 2 × 8 | 92 | 24 | (or ends) on row (or |
| 3 × 8 | 93 | 48 | column) 3 (or 12) of |
| 4 × 8 | 94 | 80 | the central area. |
| 5 × 8 | 95 | 119 | |
| 6 × 8 | 96 | 163 | |
| 7 × 8 | 97 | 210 | |

TABLE XVI - A

| Central Pixel ID | Central Pixel Coefficient ID | Surround Coefficient | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| 00 | 1 | 67 | 68 | | | 68 | | | | | | | |
| 01 | 2 | 57 | 77 | 7 | | 58 | | | | | | | |
| 02 | 3 | 47 | 87 | 17 | | 48 | | | | | | | |
| 03 | 4 | 37 | 97 | 27 | | 38 | | | | | | | |
| 04 | 5 | 27 | 97 | 37 | | 28 | | | | | | | |
| 05 | 6 | 17 | 78 | 47 | | 18 | | | | | | | |
| 06 | 7 | 7 | 77 | 57 | | 8 | | | | | | | |
| 07 | 8 | | 68 | 67 | | | | | | | | | |
| 08 | 8 | | 67 | 68 | | | | | | | | | |
| 09 | 7 | | 57 | 77 | 7 | | 8 | | | | | | |
| 0A | 6 | | 47 | 87 | 17 | | 18 | | | | | | |
| 0B | 5 | | 37 | 97 | 27 | | 28 | | | | | | |
| 0C | 4 | | 27 | 97 | 37 | | 38 | | | | | | |
| 0D | 3 | | 17 | 87 | 47 | | 48 | | | | | | |
| 0E | 2 | | 07 | 77 | 57 | | 58 | | | | | | |
| 0F | 1 | | | 68 | 67 | | 68 | | | | | | |
| 10 | 2 | 57 | 58 | | | 77 | | 7 | | | | | |
| 11 | 9 | 56 | 76 | 6 | | 76 | | 6 | | | | | |
| 12 | 10 | 46 | 86 | 16 | | 75 | | 5 | | | | | |
| 13 | 11 | 36 | 96 | 26 | | 74 | | 4 | | | | | |
| 14 | 12 | 26 | 96 | 36 | | 73 | | 3 | | | | | |
| 15 | 13 | 16 | 86 | 46 | | 72 | | 2 | | | | | |
| 16 | 14 | 6 | 76 | 56 | | 71 | | 1 | | | | | |
| 17 | 15 | | 58 | 57 | | | | | | | | | |
| 18 | 15 | | 57 | 58 | | | | | | | | | |
| 19 | 14 | | 56 | 76 | 6 | | 71 | | 1 | | | | |
| 1A | 13 | | 46 | 86 | 16 | | 72 | | 2 | | | | |
| 1B | 12 | | 36 | 96 | 26 | | 73 | | 3 | | | | |
| 1C | 11 | | 26 | 96 | 36 | | 74 | | 4 | | | | |
| 1D | 10 | | 26 | 86 | 46 | | 75 | | 5 | | | | |
| 1E | 9 | | 6 | 76 | 56 | | 76 | | 6 | | | | |
| 1F | 2 | | | 58 | 57 | | 77 | | 7 | | | | |
| 20 | 3 | 47 | 48 | | | 87 | | 17 | | | | | |
| 21 | 10 | 46 | 75 | 5 | | 86 | | 16 | | | | | |
| 22 | 16 | 45 | 85 | 15 | | 85 | | 15 | | | | | |
| 23 | 17 | 35 | 95 | 25 | | 84 | | 14 | | | | | |
| 24 | 18 | 25 | 95 | 35 | | 83 | | 13 | | | | | |
| 25 | 19 | 15 | 85 | 45 | | 82 | | 12 | | | | | |
| 26 | 20 | 5 | 75 | 46 | | 81 | | 2 | | | | | |
| 27 | 21 | | 48 | 47 | | | | | | | | | |
| 28 | 21 | | 47 | 48 | | | | | | | | | |
| 29 | 20 | | 46 | 75 | 5 | | 81 | | 2 | | | | |
| 2A | 19 | | 45 | 85 | 15 | | 82 | | 12 | | | | |
| 2B | 18 | | 35 | 95 | 25 | | 83 | | 13 | | | | |
| 2C | 17 | | 25 | 95 | 35 | | 84 | | 14 | | | | |
| 2D | 16 | | 15 | 85 | 45 | | 85 | | 15 | | | | |
| 2E | 10 | | 5 | 75 | 46 | | 86 | | 16 | | | | |
| 2F | 3 | | | 48 | 47 | | 87 | | 17 | | | | |
| 30 | 4 | 37 | 38 | | | 97 | | 27 | | | | | |
| 31 | 11 | 36 | 74 | 4 | | 96 | | 26 | | | | | |
| 32 | 17 | 35 | 84 | 14 | | 95 | | 25 | | | | | |
| 33 | 22 | 34 | 94 | 24 | | 94 | | 24 | | | | | |
| 34 | 23 | 24 | 94 | 34 | | 93 | | 23 | | | | | |
| 35 | 24 | 14 | 84 | 35 | | 92 | | 13 | | | | | |
| 36 | 25 | 4 | 74 | 36 | | 91 | | 3 | | | | | |
| 37 | 26 | | 38 | 37 | | | | | | | | | |
| 38 | 26 | | 37 | 38 | | | | | | | | | |
| 39 | 25 | | 36 | 74 | 4 | | 91 | | 3 | | | | |
| 3A | 24 | | 35 | 84 | 14 | | 92 | | 13 | | | | |
| 3B | 23 | | 34 | 94 | 24 | | 93 | | 23 | | | | |
| 3C | 22 | | 24 | 94 | 34 | | 94 | | 24 | | | | |
| 3D | 17 | | 14 | 84 | 35 | | 95 | | 25 | | | | |
| 3E | 11 | | 4 | 74 | 36 | | 96 | | 26 | | | | |
| 3F | 4 | | | 38 | 37 | | 97 | | 27 | | | | |
| 40 | 5 | 27 | 28 | | | 97 | | 37 | | | | | |
| 41 | 12 | 26 | 73 | 3 | | 96 | | 36 | | | | | |
| 42 | 18 | 25 | 83 | 13 | | 95 | | 35 | | | | | |
| 43 | 23 | 24 | 93 | 23 | | 94 | | 34 | | | | | |
| 44 | 27 | 23 | 93 | 24 | | 93 | | 24 | | | | | |
| 45 | 28 | 13 | 83 | 25 | | 92 | | 14 | | | | | |
| 46 | 29 | 3 | 73 | 26 | | 91 | | 4 | | | | | |
| 47 | 30 | | 28 | 27 | | | | | | | | | |
| 48 | 30 | | 27 | 28 | | | | | | | | | |
| 49 | 29 | | 26 | 73 | 3 | | 91 | | 4 | | | | |
| 4A | 28 | | 25 | 83 | 13 | | 92 | | 14 | | | | |
| 4B | 27 | | 24 | 93 | 23 | | 93 | | 24 | | | | |
| 4C | 23 | | 23 | 93 | 24 | | 94 | | 34 | | | | |
| 4D | 18 | | 13 | 83 | 25 | | 95 | | 35 | | | | |
| 4E | 12 | | 3 | 73 | 26 | | 96 | | 36 | | | | |
| 4F | 5 | | | 28 | 27 | | 97 | | 37 | | | | |
| 50 | 6 | 17 | 18 | | | 87 | | 47 | | | | | |
| 51 | 13 | 16 | 72 | 2 | | 86 | | 46 | | | | | |
| 52 | 19 | 15 | 82 | 12 | | 85 | | 45 | | | | | |
| 53 | 24 | 14 | 92 | 13 | | 84 | | 35 | | | | | |
| 54 | 28 | 13 | 92 | 14 | | 83 | | 25 | | | | | |
| 55 | 31 | 12 | 82 | 15 | | 82 | | 15 | | | | | |
| 56 | 32 | 2 | 72 | 16 | | 81 | | 5 | | | | | |
| 57 | 33 | | 18 | 17 | | | | | | | | | |
| 58 | 33 | | 17 | 18 | | | | | | | | | |
| 59 | 36 | | 16 | 72 | 2 | | 81 | | 5 | | | | |
| 5A | 31 | | 15 | 82 | 12 | | 82 | | 15 | | | | |
| 5B | 28 | | 14 | 92 | 13 | | 83 | | 25 | | | | |
| 5C | 24 | | 13 | 92 | 14 | | 84 | | 35 | | | | |
| 5D | 19 | | 12 | 82 | 15 | | 85 | | 45 | | | | |
| 5E | 13 | | 2 | 72 | 16 | | 86 | | 46 | | | | |
| 5F | 6 | | | 18 | 17 | | 87 | | 47 | | | | |
| 60 | 7 | 7 | 8 | | | 77 | | 75 | | | | | |
| 61 | 14 | 6 | 71 | 1 | | 76 | | 56 | | | | | |
| 62 | 20 | 5 | 81 | 2 | | 75 | | 46 | | | | | |
| 63 | 25 | 4 | 91 | 3 | | 74 | | 36 | | | | | |
| 64 | 29 | 3 | 91 | 4 | | 73 | | 26 | | | | | |
| 65 | 32 | 2 | 81 | 5 | | 72 | | 16 | | | | | |
| 66 | 34 | 1 | 71 | 6 | | 71 | | 6 | | | | | |
| 67 | 35 | | 8 | 7 | | | | | | | | | |
| 68 | 35 | | 7 | 8 | | | | | | | | | |
| 69 | 34 | | 6 | 71 | 1 | | 71 | | 6 | | | | |
| 6A | 32 | | 5 | 81 | 2 | | 72 | | 16 | | | | |
| 6B | 29 | | 4 | 91 | 3 | | 73 | | 26 | | | | |
| 6C | 25 | | 3 | 91 | 4 | | 74 | | 36 | | | | |
| 6D | 20 | | 2 | 81 | 5 | | 75 | | 46 | | | | |
| 6E | 14 | | 1 | 71 | 6 | | 76 | | 56 | | | | |
| 6F | 7 | | | 8 | 7 | | 77 | | 57 | | | | |
| 70 | 8 | | | | | 68 | | 67 | | | | | |
| 71 | 15 | | | | | 58 | | 57 | | | | | |
| 72 | 21 | | | | | 48 | | 47 | | | | | |
| 73 | 26 | | | | | 38 | | 37 | | | | | |
| 74 | 30 | | | | | 28 | | 27 | | | | | |
| 75 | 33 | | | | | 18 | | 17 | | | | | |
| 76 | 35 | | | | | 8 | | 1 | | | | | |
| 77 | 36 | | | | | | | | | | | | |
| 78 | 36 | | | | | | | | | | | | |
| 79 | 35 | | | | | 8 | | 7 | | | | | |
| 7A | 33 | | | | | 18 | | 17 | | | | | |
| 7B | 30 | | | | | 28 | | 27 | | | | | |
| 7C | 26 | | | | | 38 | | 37 | | | | | |
| 7D | 21 | | | | | 48 | | 47 | | | | | |
| 7E | 15 | | | | | 58 | | 57 | | | | | |
| 7F | 8 | | | | | 68 | | 67 | | | | | |
| 80 | 8 | | | | | 7 | | 68 | | | | | |
| 81 | 15 | | | | | 17 | | 58 | | | | | |
| 82 | 21 | | | | | 27 | | 48 | | | | | |
| 83 | 26 | | | | | 37 | | 38 | | | | | |
| 84 | 30 | | | | | 47 | | 28 | | | | | |
| 85 | 33 | | | | | 56 | | 18 | | | | | |
| 86 | 35 | | | | | 67 | | 8 | | | | | |
| 87 | 36 | | | | | | | | | | | | |
| 88 | 36 | | | | | | | | | | | | |
| 89 | 35 | | | | | | | 7 | 8 | | | | |
| 8A | 33 | | | | | | | 17 | 18 | | | | |
| 8B | 30 | | | | | | | 27 | 28 | | | | |
| 8C | 26 | | | | | | | 37 | 38 | | | | |
| 8D | 21 | | | | | | | 47 | 48 | | | | |
| 8E | 15 | | | | | | | 57 | 58 | | | | |
| 8F | 8 | | | | | | | 67 | 68 | | | | |
| 90 | 7 | | | | | 57 | | 77 | | 7 | 8 | | |
| 91 | 14 | | | | | 56 | | 76 | | 6 | 71 | 1 | |
| 92 | 20 | | | | | 46 | | 75 | | 5 | 81 | 2 | |
| 93 | 25 | | | | | 36 | | 74 | | 4 | 91 | 3 | |
| 94 | 29 | | | | | 26 | | 73 | | 3 | 91 | 4 | |
| 95 | 32 | | | | | 16 | | 72 | | 2 | 81 | 5 | |

TABLE XVI - A-continued

| Central Pixel ID | Central Pixel Coefficient ID | 1 | 2 | 3 | 4 | 5 | 6 | 7 | 8 | 9 | 10 | 11 | 12 |
|---|---|---|---|---|---|---|---|---|---|---|---|---|---|
| 96 | 34 | | | | | | 6 | | 71 | | 1 | 71 | 6 |
| 97 | 35 | | | | | | | | | | 8 | 7 | |
| 98 | 35 | | | | | | | | | | 7 | 8 | |
| 99 | 34 | | | | | | 6 | | 71 | | 6 | 71 | 1 |
| 9A | 32 | | | | | | 16 | | 72 | | 5 | 81 | 2 |
| 9B | 29 | | | | | | 26 | | 73 | | 4 | 91 | 3 |
| 9C | 25 | | | | | | 36 | | 74 | | 3 | 91 | 4 |
| 9D | 20 | | | | | | 46 | | 75 | | 2 | 81 | 5 |
| 9E | 14 | | | | | | 56 | | 76 | | 1 | 71 | 6 |
| 9F | 7 | | | | | | 57 | | 77 | | | 8 | 7 |
| A0 | 6 | | | | | 47 | | 87 | | 17 | 18 | | |
| A1 | 13 | | | | | 46 | | 86 | | 16 | 72 | 2 | |
| A2 | 19 | | | | | 45 | | 85 | | 15 | 82 | 12 | |
| A3 | 24 | | | | | 35 | | 84 | | 14 | 92 | 13 | |
| A4 | 28 | | | | | 25 | | 83 | | 13 | 92 | 14 | |
| A5 | 31 | | | | | 15 | | 82 | | 12 | 82 | 15 | |
| A6 | 32 | | | | | 5 | | 81 | | 2 | 72 | 16 | |
| A7 | 33 | | | | | | | | | | 18 | 17 | |
| A8 | 33 | | | | | | | | | | 17 | 18 | |
| A9 | 32 | | | | | | 5 | | 81 | | 16 | 72 | 2 |
| AA | 31 | | | | | | 15 | | 82 | | 15 | 82 | 12 |
| AB | 28 | | | | | | 25 | | 83 | | 14 | 92 | 13 |
| AC | 24 | | | | | | 35 | | 84 | | 13 | 92 | 14 |
| AD | 19 | | | | | | 45 | | 85 | | 12 | 82 | 15 |
| AE | 13 | | | | | | 46 | | 86 | | 2 | 72 | 16 |
| AF | 6 | | | | | | 47 | | 87 | | | 18 | 17 |
| B0 | 5 | | | | | 37 | | 97 | | 27 | 28 | | |
| B1 | 12 | | | | | 36 | | 96 | | 26 | 73 | 3 | |
| B2 | 18 | | | | | 35 | | 95 | | 25 | 83 | 13 | |
| B3 | 23 | | | | | 34 | | 94 | | 24 | 93 | 23 | |
| B4 | 27 | | | | | 24 | | 93 | | 23 | 93 | 24 | |
| B5 | 28 | | | | | 14 | | 92 | | 13 | 83 | 25 | |
| B6 | 29 | | | | | 4 | | 91 | | 3 | 73 | 26 | |
| B7 | 30 | | | | | | | | | | 28 | 27 | |
| B8 | 30 | | | | | | | | | | 27 | 28 | |
| B9 | 29 | | | | | | 4 | | 91 | | 26 | 73 | 3 |
| BA | 28 | | | | | | 14 | | 92 | | 25 | 83 | 13 |
| BB | 27 | | | | | | 24 | | 93 | | 24 | 93 | 23 |
| BC | 23 | | | | | | 34 | | 94 | | 23 | 93 | 24 |
| BD | 18 | | | | | | 35 | | 95 | | 13 | 83 | 25 |
| BE | 12 | | | | | | 36 | | 96 | | 3 | 73 | 26 |
| BF | 5 | | | | | | 37 | | 97 | | | 28 | 27 |
| C0 | 4 | | | | | 27 | | 97 | | 37 | 38 | | |
| C1 | 11 | | | | | 26 | | 96 | | 36 | 74 | 4 | |
| C2 | 17 | | | | | 25 | | 95 | | 35 | 84 | 14 | |
| C3 | 22 | | | | | 24 | | 94 | | 34 | 94 | 24 | |
| C4 | 23 | | | | | 23 | | 93 | | 24 | 94 | 34 | |
| C5 | 24 | | | | | 13 | | 92 | | 14 | 84 | 35 | |
| C6 | 35 | | | | | 3 | | 91 | | 4 | 74 | 36 | |
| C7 | 26 | | | | | | | | | | 38 | 37 | |
| C8 | 26 | | | | | | | | | | 37 | 38 | |
| C9 | 25 | | | | | | 3 | | 91 | | 36 | 74 | 4 |
| CA | 24 | | | | | | 13 | | 92 | | 35 | 84 | 14 |
| CB | 23 | | | | | | 23 | | 93 | | 34 | 94 | 24 |
| CC | 22 | | | | | | 24 | | 94 | | 24 | 94 | 34 |
| CD | 17 | | | | | | 25 | | 95 | | 14 | 84 | 35 |
| CE | 11 | | | | | | 26 | | 96 | | 4 | 74 | 36 |
| CF | 4 | | | | | | 27 | | 97 | | | 38 | 37 |
| D0 | 3 | | | | | 17 | | 87 | | 47 | 48 | | |
| D1 | 10 | | | | | 14 | | 86 | | 46 | 75 | 5 | |
| D2 | 16 | | | | | 15 | | 85 | | 45 | 85 | 15 | |
| D3 | 17 | | | | | 14 | | 84 | | 35 | 95 | 25 | |
| D4 | 18 | | | | | 13 | | 83 | | 25 | 95 | 35 | |
| D5 | 19 | | | | | 12 | | 82 | | 15 | 85 | 45 | |
| D6 | 20 | | | | | 2 | | 81 | | 5 | 75 | 46 | |
| D7 | 21 | | | | | | | | | | 48 | 47 | |
| D8 | 21 | | | | | | | | | | 47 | 48 | |
| D9 | 20 | | | | | | 2 | | 81 | | 46 | 75 | 5 |
| DA | 19 | | | | | | 12 | | 82 | | 45 | 85 | 15 |
| DB | 18 | | | | | | 13 | | 83 | | 35 | 95 | 25 |
| DC | 17 | | | | | | 14 | | 84 | | 25 | 95 | 35 |
| DD | 16 | | | | | | 15 | | 85 | | 15 | 85 | 45 |
| DE | 10 | | | | | | 16 | | 86 | | 5 | 75 | 46 |
| DF | 3 | | | | | | 17 | | 87 | | | 48 | 47 |
| E0 | 2 | | | | | | | 7 | | 77 | | 57 | 58 |
| E1 | 9 | | | | | | 6 | | 76 | | 56 | 76 | 6 |
| E2 | 10 | | | | | | 5 | | 75 | | 46 | 86 | 16 |
| E3 | 11 | | | | | | 4 | | 74 | | 36 | 96 | 26 |
| E4 | 12 | | | | | | 3 | | 73 | | 26 | 96 | 36 |
| E5 | 13 | | | | | | 2 | | 72 | | 16 | 86 | 46 |
| E6 | 14 | | | | | | 1 | | 71 | | 6 | 76 | 56 |
| E7 | 15 | | | | | | | | | | 58 | 57 | |
| E8 | 15 | | | | | | | | | | 57 | 58 | |
| E9 | 14 | | | | | | | 1 | | 71 | | 56 | 76 | 6 |
| EA | 13 | | | | | | | 2 | | 72 | | 46 | 86 | 16 |
| EB | 12 | | | | | | | 3 | | 73 | | 36 | 96 | 26 |
| EC | 11 | | | | | | | 4 | | 74 | | 26 | 96 | 36 |
| ED | 10 | | | | | | | 5 | | 75 | | 16 | 86 | 46 |
| EE | 9 | | | | | | | 6 | | 76 | | 6 | 76 | 56 |
| EF | 2 | | | | | | | 7 | | 77 | | | 58 | 57 |
| F0 | 1 | | | | | | | | | | 68 | 67 | 68 | |
| F1 | 2 | | | | | | | | | | 58 | 57 | 77 | 7 |
| F2 | 3 | | | | | | | | | | 48 | 47 | 87 | 17 |
| F3 | 4 | | | | | | | | | | 38 | 37 | 97 | 27 |
| F4 | 5 | | | | | | | | | | 28 | 27 | 97 | 37 |
| F5 | 6 | | | | | | | | | | 18 | 17 | 87 | 47 |
| F6 | 7 | | | | | | | | | | 8 | 7 | 77 | 57 |
| F7 | 8 | | | | | | | | | | | | 68 | 67 |
| F8 | 8 | | | | | | | | | | | | 67 | 68 |
| F9 | 7 | | | | | | | | | | 8 | | 57 | 77 | 7 |
| FA | 6 | | | | | | | | | | 18 | | 47 | 87 | 17 |
| FB | 5 | | | | | | | | | | 28 | | 37 | 97 | 27 |
| FC | 4 | | | | | | | | | | 38 | | 27 | 97 | 37 |
| FD | 3 | | | | | | | | | | 48 | | 17 | 87 | 47 |
| FE | 2 | | | | | | | | | | 58 | | 7 | 77 | 57 |
| FF | 1 | | | | | | | | | | 65 | | | 68 | 67 |

TABLE XVII

X = DON'T CARE. SURROUND AREA SELECTED BY ADDRESS BITS 7 AND 3 LEVEL 4

| Surround Area | Central Pixel Address | |
|---|---|---|
| | Bit 7 | Bit 3 |
| 1 | 0 | 0 |
| 4 | 0 | 1 |
| 9 | 1 | 0 |
| 12 | 1 | 1 |
| 2 | 0 | X |
| 11 | 1 | X |
| 3 | 0 | X |
| 10 | 1 | X |
| 5 | X | 0 |
| 8 | X | 1 |
| 6 | X | 1 |
| 7 | X | 0 |

Figure 12:
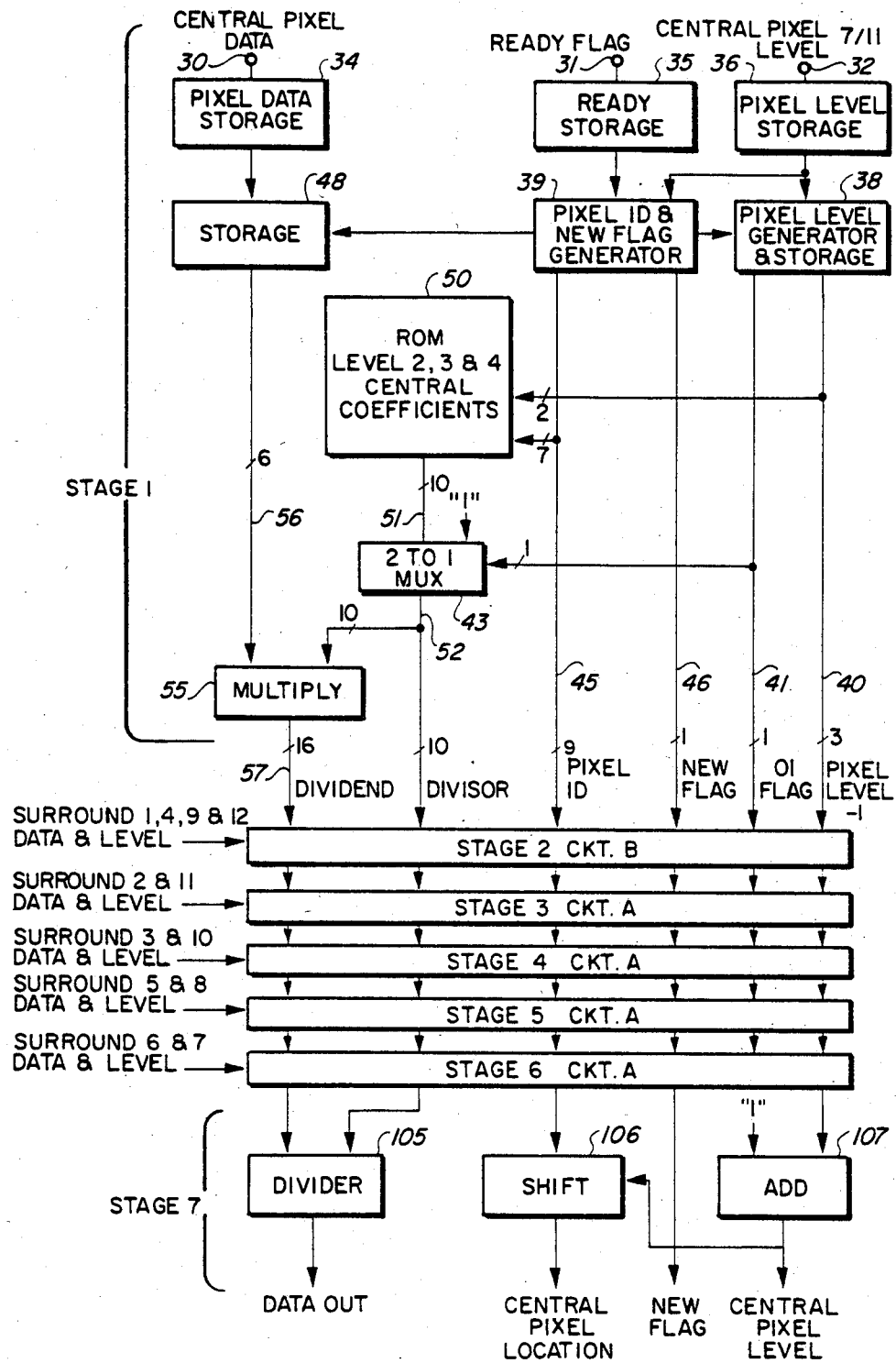
FIGS. 12 and 13 are a block diagram of apparatus for smoothing MAPS compressed image data embodying the present invention.
Figure 13:
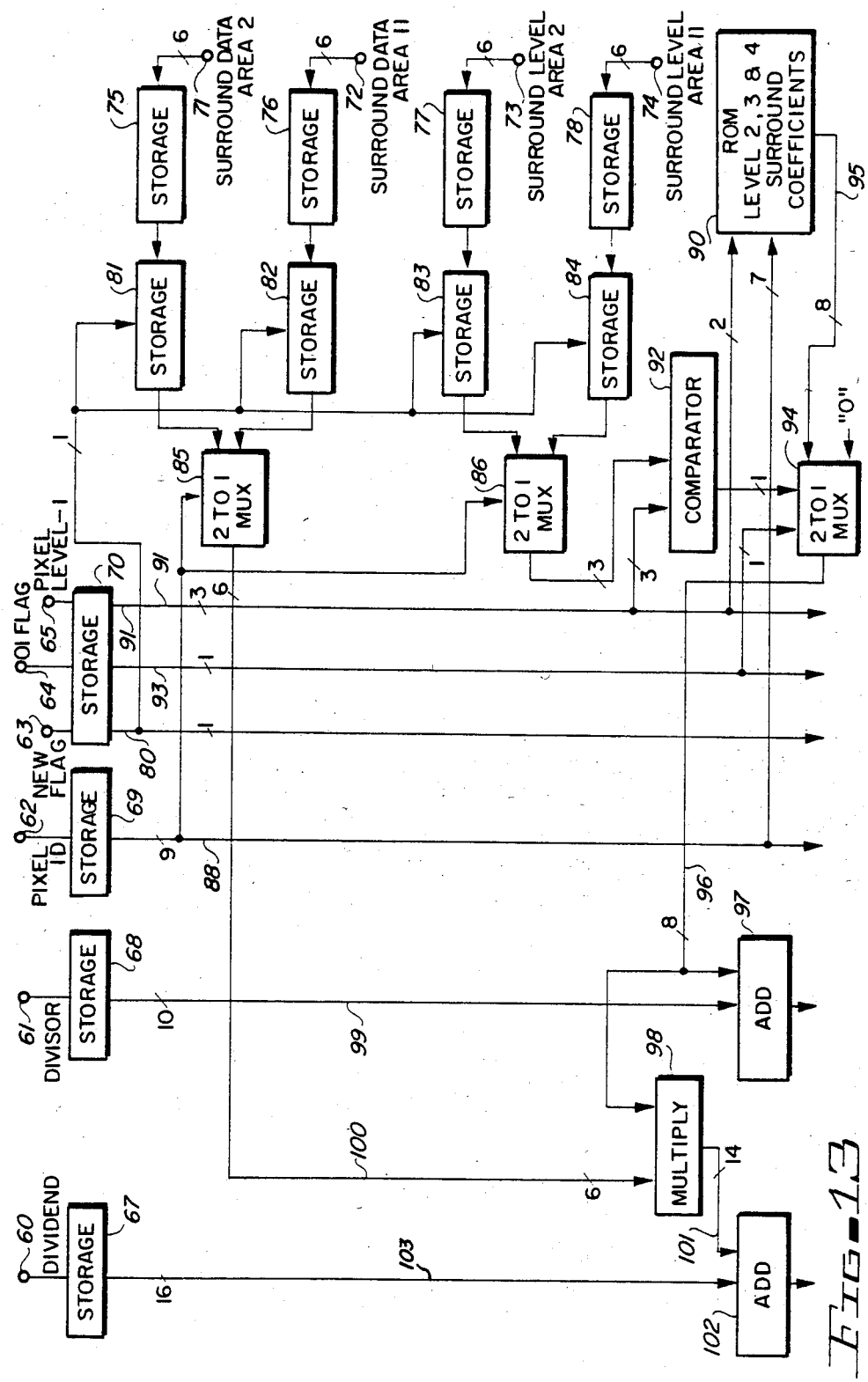

Referring specifically to FIGS. 12 and 13, a pipeline type of embodiment of apparatus for smoothing MAPS compressed image data incorporating the present invention is illustrated. The pipeline design includes 7 stages, which are designated stage 1 through stage 7. Stage 1 computes the product of the central coefficient and the central data and includes 3 input terminals 30, 31 and 32 adapted to receive central pixel data, a ready flag, and the central pixel level, respectively. The information received at the terminals 30, 31 and 32 is placed immediately in storage units 34, 35 and 36, respectively, for further processing. The pixel level information from storage unit 36 is supplied to a pixel level generator 38 and a pixel ID and new flag generator 39. The pixel level generator 38 supplies a three-bit word indicative of the pixel level minus 1 to stage 2 on a 3 line bus 40. By subtracting 1 from the level (actually −1 will be added) in the pixel level generator 38, the comparison of the central and surround levels in stages 2 to 6 is simplified and the hardware is minimized. A line 41 from the generator 38 carries an 01flag which is asserted when the central area is at levels 2, 3, or 4 and not asserted for levels 0 and 1. This line is supplied to stage 2 and will be used for steering data in stages 1 to 6. The line is also connected to the control input of a 2-to-1 multiplexer 43. The pixel ID and new flag generator 39 is an 8 bit counter which is preset by a signal from the pixel level storage unit 36 as shown below.

| Central Level | Counter Preset |
|---|---|
| 0 | 0 |
| 1 | 3 |
| 2 | 15 |
| 3 | 63 |
| 4 | 255 |

The generator 39 supplies a pixel ID on a nine line bus 45, a new flag on a line 46 and two strobes, one of which is connected to pixel level generator 38 and the other of which is connected to a storage unit 48. The two strobes from the generator 39 are used to transfer central pixel data from the storage unit 34 to the storage unit 48 and pixel level data from the storage unit 36 to the generator and storage unit 38. Table VI, X and XVIII illustrate different pairs of bits used to select correct surround areas for levels 3, 2, and 4, respectively.

The generator 39 produces the 9 bit output as follows. A counter is preset as previously described and the output shifted as shown in Table XVIII. If A7 is a 1, the counter outputs which are passed through (excluding A7) are complemented. For example, with a level 3 coefficient, A6, A5, A3, A2, and A1 are complemented if A7 is a 1, but not complemented if A7 is a 0.

Bits A0 to A6 are used to address the ROM's which contain the central coefficient, stage 1, and the surround coefficients, stage 2 to 6. Bit 7 is used in stage 7 to reconstruct the pixel address and in conjunction with S0, described next, to select the appropriate surround data and level in stages 2 to 6.

S0, the remaining bit is connected to counter output A3 (the complimenting is performed subsequent to the counter) before the complement is performed.

TABLE XVIII

| CENTRAL COEFFICIENT LEVEL | PIXEL ID BITS | | | | | | | | |
|---|---|---|---|---|---|---|---|---|---|
| | S0 | A7 | A6 | A5 | A4 | A3 | A2 | A1 | A0 |
| 0 | 0 | 0 | 0 | 0 | 0 | 0 | 0 | 0 | $Q_0$ |
| 1 | 0 | 0 | 0 | 0 | 0 | 0 | 0 | $Q_1$ | $Q_0$ |
| 2 | $Q_1$ | $Q_3$ | $Q_2$ | 0 | 0 | $Q_1$ | $Q_0$ | 0 | 0 |
| 3 | $Q_2$ | $Q_5$ | $Q_4$ | $Q_3$ | 0 | $Q_2$ | $Q_1$ | $Q_0$ | 0 |
| 4 | $Q_3$ | $Q_7$ | $Q_6$ | $Q_5$ | $Q_4$ | $Q_3$ | $Q_2$ | $Q_1$ | $Q_0$ |

The new flag on line 46 is asserted when the first pixel of levels 2, 3 and 4 is being processed in stage 1. The flag is not asserted when processing the remaining pixels at these levels or when level 0 and 1 pixels are being processed. The new flag is used to obtain a continuous flow of data through the pipeline system, which will be described in more detail presently.

Two 512×8 ROMs 50 have the central coefficients for levels 2, 3 and 4 stored therein. The ROMs 50 normally have a 16 bit output but, because the largest value for a central coefficient is 680 (see Table XII), only 10 of the 16 output bits are used.

ROM 50 has 9 address inputs, 7 of which are the 7 lower order pixel ID lines from bus 45 and the remaining 2 of which are the 2 lower order bits from bus 40. The latter subdivides ROM 50 into 4 segments of 128 words each as shown below.

| LEVEL | LEVEL −1 | ADDRESS RANGE (HEX) |
|---|---|---|
| 0 | 111 | 180 to 1FF |
| 1 | 000 | 0 to 7 F |
| 2 | 001 | 80 to FF |
| 3 | 010 | 100 to 17 F |
| 4 | 011 | 180 to 1 FF |

Level 1 has an assigned segment in ROM 50, and level 0 is assigned the same segment as level 4. However, the 01Flag selects the value 1 input for level 0 and 1 at Mux 43, so these assignments are irrelevant.

Level 4 requires 128 coefficients so all 128 locations in ROM 50 allocated to level 4 coefficients are used. Level 3 requires 32 locations (out of 128 available), but not every fourth location has a coefficient. In the first 16 locations, 100 to 10F (base 16), every other location contains a coefficient. However, the next 16 locations, 110 to 10F, base 16, do not contain any coefficients. This pattern is repeated for the 128 word segment.

Level 2, which requires only 8 locations, is ordered in a similar manner. The first 16 locations contain only 4 coefficients, and the next 48 locations do not contain any coefficients. These unused locations, and those allocated to level 1 do not require any specific data and do not need to be programmed.

The 10 output bits are supplied on a 10 lead bus 51 to a first input of the 2 to 1 multiplexer 43. A second input of the multiplexer 43 has a constant value 1 thereon. The 01flag from lead 41 selects which of the two inputs are supplied to the output thereof. The output of multiplexer 43 is a 10 lead bus 52, which is connected to stage 2 and to a first input of a multiplier 55. The central pixel data from storage unit 48 is supplied to a second input of multiplier 55 on a 6 lead bus 56. The multiplier 55 outputs the product of either the central pixel data and the appropriate central coefficient (for levels 2, 3, and 4) or the unchanged central pixel data (for levels 0 and 1). The output of multiplier 55 is supplied on a 16 line bus 57 to an input of stage 2. Thus, stage 1 supplies the dividend (the product of the central data and coefficient) on bus 57, the divisor (central coefficient) on bus 52, the pixel ID on bus 45, the pixel level minus 1 on bus 40, the 01 flag on lead 41 and the new flag on lead 46.

FIG. 13 is a block diagram for stages 3 to 6 of FIG. 12, designated circuit type A. Stage 2 of FIG. 12 is designated circuit type B and differs from circuit type A only in that it receives inputs from 4 surround areas, rather than 2 as in circuit type A. Therefore, circuit type B (stage 2) has storage for data and levels from 4 surround areas and 4 to 1 multiplexers are used to select the appropriate surround data and levels. The select inputs to the 4 to 1 multiplexers are bits A7 and S0 of the pixel ID, as will become apparent from the following description of FIG. 13. The description of FIG. 13 will be provided in conjunction with stage 3 but it should be understood that the identical circuit is used in stages 4 through 6 and in stage 2 with the above noted exceptions.

Referring specifically to FIG. 13, data from stage 2 is supplied at input terminals 60 through 65. The dividend signal on input terminal 60 is entered into a storage unit 67. The divisor on terminal 61 is entered into a storage unit 68. The pixel ID data on input terminal 62 is entered into a storage unit 69. The new flag, 01flag and pixel level minus 1 are all entered into a storage unit 70. Surround data from area 2 is supplied on a 6-lead input bus 71 to a storage unit 75. Surround data from area 11 is supplied on a 6-lead input bus 72 to a storage unit 76. Surround level information from area 2 is supplied on a 3 lead input bus 73 to a storage unit 77. Surround level information from area 11 is supplied on a 3-lead input bus 74 to a storage unit 78. Storage unit 70 has an output lead 80 which is connected to 4 second level storage units 81 through 84, having inputs connected to storage units 75 through 78. If the new flag is asserted on line 80, data and levels are transferred from the first rank of storage units 75 through 78 to the second rank 81 through 84. The new flag is also supplied to the next stage on line 80. The outputs of storage units 81 and 82 are supplied to 2 inputs of a 2 to 1 multiplexer 85. Outputs of storage units 83 and 84 are supplied to 2 inputs of a 2 to 1 multiplexer 86. Storage unit 69, containing pixel ID information, has an 9 lead output bus 88, a single lead (bit 7, the MS bit of the pixel ID) of which is connected to the select inputs of each of the multiplexers 85 and 86. For stages 3 and 4, bit A7 is connected to the select input of the two multiplexers and for stages 5 and 6, bit S0 is used as the select input. Pixel ID and new flag generator 39 (FIG. 12) provides the correct 4, 6 or 8 bit ID on bus 45 in response to the pixel level from storge unit 36. The pixel ID bits are connected to the bus 45 so that the fourth, sixth and eighth bits of the counter output always appear on the same line (A7) and that line of bus 88 or S0 is connected to the select inputs of multiplexers 85 and 86 as previously described. The remaining 7 leads, A0 to A6 of bus 88 are connected to address inputs of a ROM 90 which supplies the surround coefficients for levels 2, 3 and 4 in a fashion similar to that explained for ROM 50 of FIG. 12. Two remaining address lines for ROM 90 are connected to 2 lower order lines of a bus 91 connected to the output of storage unit 70 and having pixel level −1 information thereon. All 3 of the leads of bus 91 are connected to one input of a comparator 92. A 3 lead bus connected to the output of multiplexer 86 is connected to a second input of comparator 92. The output of comparator 92 is connected by a single lead to the select input of a 2 to 1 multiplexer 94. The 01flag from storage unit 70 is connected to a strobe input of the multiplexer 94. The output of ROM 90 on an 8 lead bus 95 is connected to a first input of the multiplexer 94 and the second input has a constant 0 applied thereto. The output of the multiplexer 94 on an 8 lead bus 96 is connected to one input of an adder 97 and one input of a multiplier 98. A second input of adder 97 is connected by means of a 10 lead bus 99 to the output of storage unit 68. A second input of multiplier 98 is connected by a 6 lead bus 100 to the output of multiplexer 85. The output of multiplier 98 is connected by a 14 lead bus 101 to an adder 102. A second input of adder 102 is connected by a 16 lead bus 103 to the output of storage unit 67.

In the operation of the circuit of FIG. 13, data from the previous stage (in this example stage 2) is entered into the storage units 67 through 70. If the new flag is asserted on line 64, data and levels are transferring from the first rank of storage units 75 through 78 to the second rank 81 through 84. The level of the appropriate surround is entered through multiplexer 86 and the output thereof is one input to comparator 92. The other input is the pixel level −1 data on bus 91. The output from comparator 92 is connected to the select line of multiplexer 94 and the 01flag on output lead 93 from storage unit 70 is connected to the strobe input of multiplexer 94. If the surround level is greater than or equal to the central level minus one, the condition previously mentioned and the 01flag is asserted, the surround coefficient from ROM 90 is selected. If the condition is not met, zero is steered through the multiplexer 94. The output from multiplexer 94 is added to the input divisor (appearing on bus 99) in adder 97. Simultaneously the output from multiplexer 94 is multiplied by the surround data from multiplexer 85 in multiplier 98. The output from multiplier 98 is added to the dividend, appearing on bus 103, in adder 102. Since the output of multiplexer 94 is 0 if the surround level and central level condition is not met, or if the central pixel is at level 0 or 1, the input dividend and divisor are not changed.

In stage 7, FIG. 12, a divider 105 receives the dividend and divisor signals from stage 6 and performs the division operation. The output of divider 105 is the final data output. Stage 7 also includes an adder 107 which receives the pixel level on a first input and a 1 on a second input to restore the pixel level to the correct value. A shift circuit 106 receives the pixel ID and the central pixel level from the add circuit 107 to restore the pixel ID to its original form. It is evident from the above description that central data at levels 0 and 1 pass through stages 2 to 6 unchanged. By setting the divisor output from multiplexer 43 (FIG. 12) to 1, the divide operation also leaves the data unchanged.

Three clock cycles are required to perform the operations in each stage. During the first cycle, the counter in the pixel ID and new flag generator 39 is incremented and the pixel ID is formed. In stages 2 to 6, the input data is stored, the surround level and data are selected, the levels are compared, and the appropriate data from the ROM containing the surround coefficients or a zero is selected. Note that the level selection and comparison is done in parallel with accessing the ROM. During the second cycle ROM 50 in stage 1 is accessed and either its output or a 1 is steered through multiplexer 43 to multiplier 55. In stages 2 to 6 the surround data and coefficients are multiplied and the surround coefficient is added to the divisor. During the third cycle the multiply operation in the first stage is accomplished. In stages 2 to 6 the multiplier output is added to the dividend. The division operation in divider 105 can be accomplished in 2 cycles assuming a lookup table, containing the reciprocal of the divisor, and a multiplier are utilized. Therefore, a new output pixel is available every 3 clock cycles. Assuming an 8 megahertz clock, the hardware can process $2.66 \times 10^6$ pixels per second. The delay time from input to output is 21 clock cycles.

Obtaining a continuous flow of data by eliminating the need to flush out the pipeline at the end of processing each level is accomplished with the new flag line and the double buffering of the surround data and level inputs at stage 2 to 6. The new flag line is asserted when the first pixel of a new central area (levels 2 to 4) is being processed in the first stage. As this pulse enters successive stages, the surround data and levels are transferred to the second rank of storage. Therefore, any of the stages, 2 to 5, can be operating on the first pixel of one central area, and the next stage can be operating on the last pixel of the previous central area. Central levels 0 and 1 do not use surround data and levels so the new flag line is not asserted when the first (only for a level 0) pixel is being processed in stage 1. Therefore, surround data for the next central area can be entered into the storage followed by the central level and data.

Figure 14:
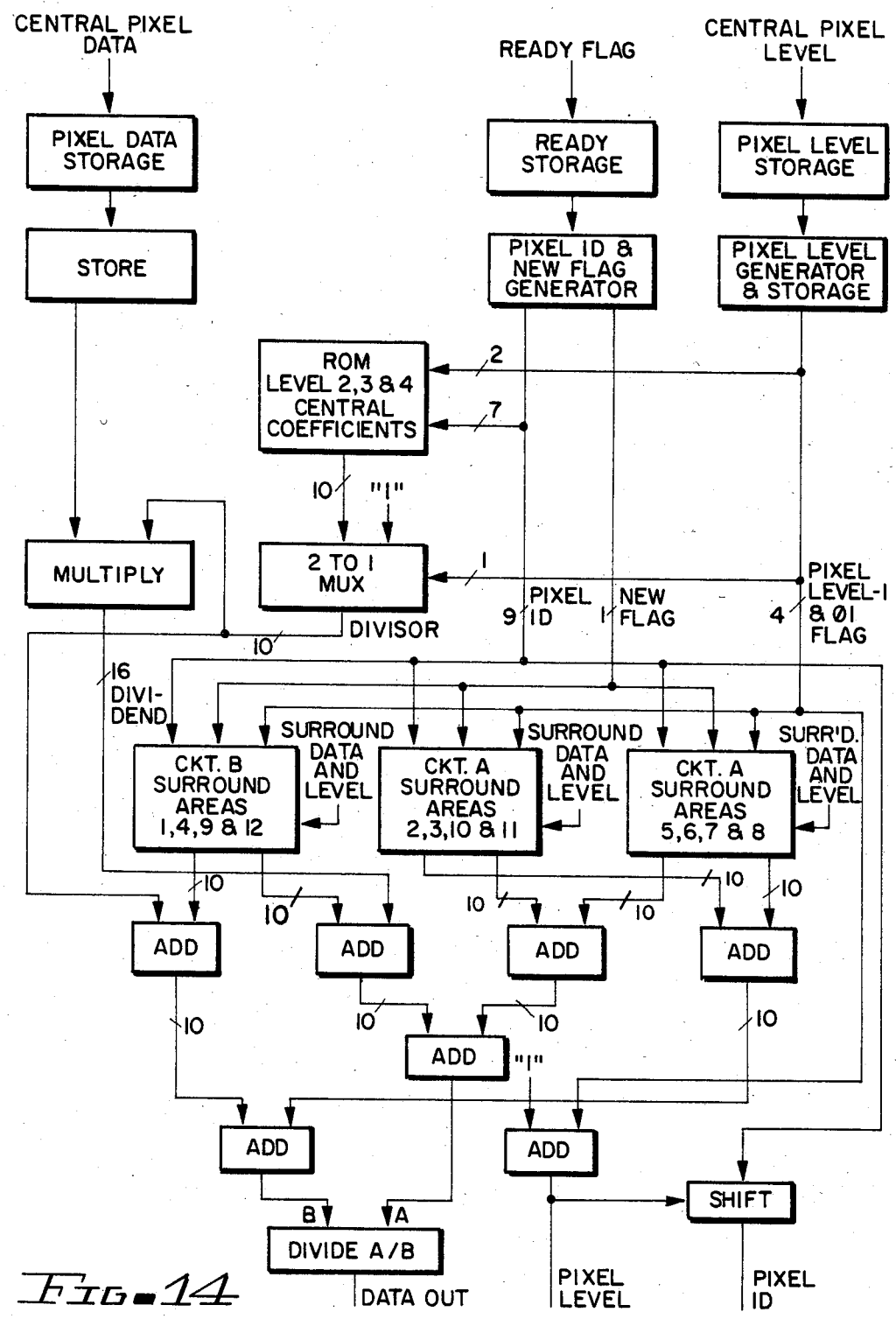
FIGS. 14, 15 and 16 are a block diagram of another embodiment of smoothing apparatus.
Figure 15:
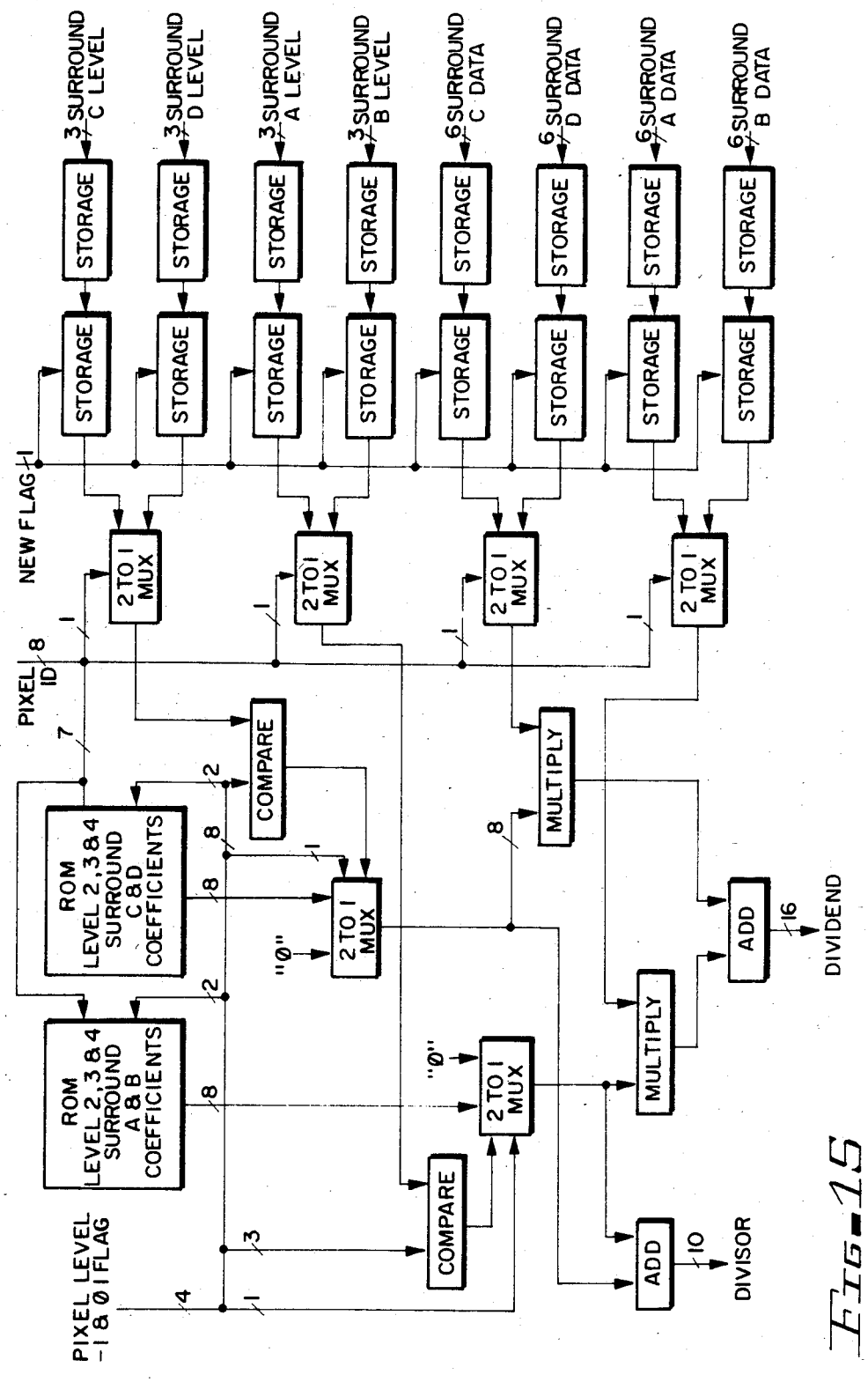
Figure 16:
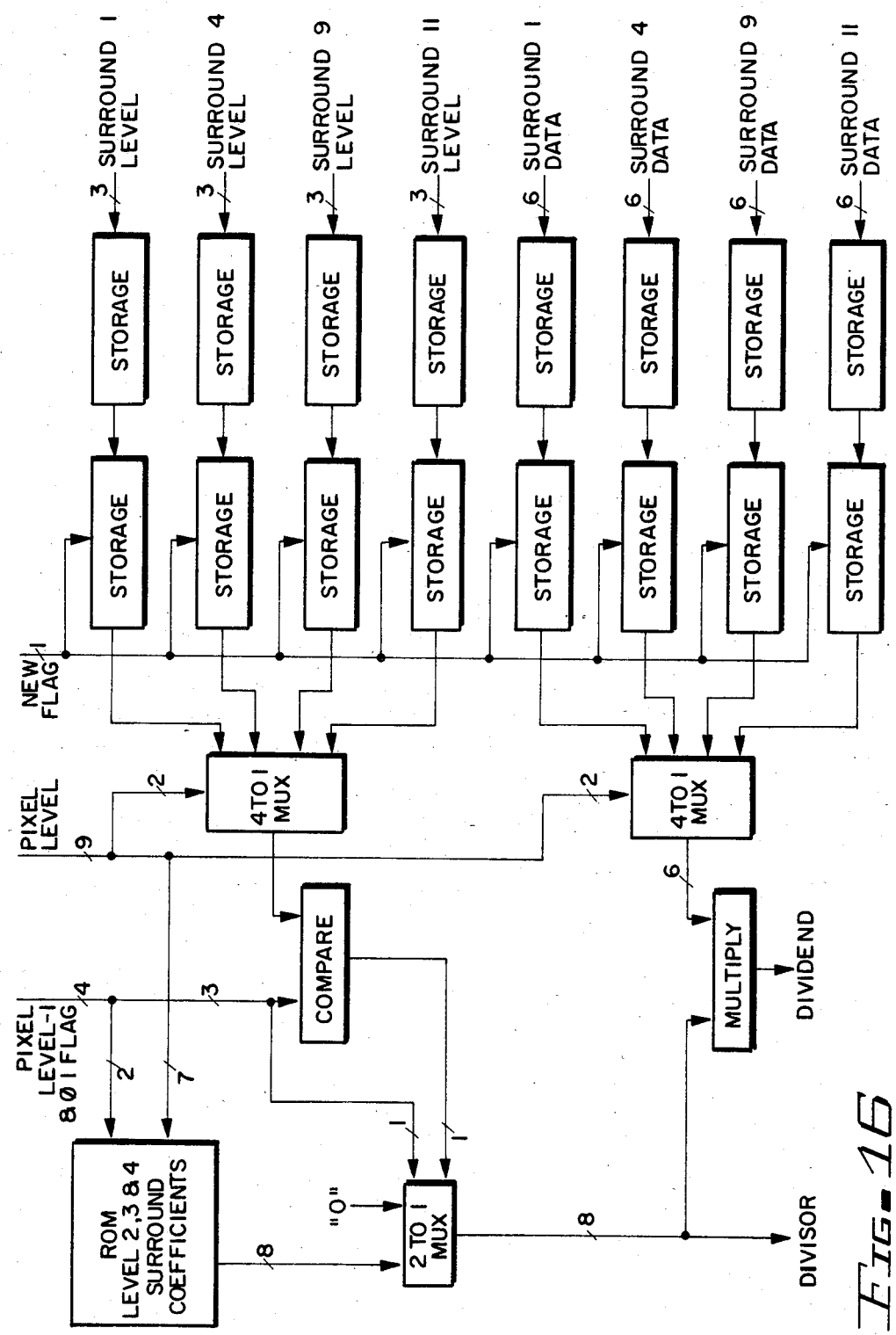

FIG. 14 is a block diagram of a parallel embodiment of apparatus for smoothing MAPS compressed image data incorporating the present invention. The products of the central data and coefficient and the surround data and coefficients are computed simultaneously in this embodiment. The divisor and dividend terms are then added and the divide operation is the last step in the process. The upper section of FIG. 14 is identical to stage 1 of the pipeline design illustrated in FIG. 12. Circuits A and B of FIG. 14 are illustrated in FIGS. 15 and 16, respectively. The only difference between the two circuits is that circuit B outputs the sum of two products (surround coefficient multiplied by surround data) and the sums of two coefficients while circuit A outputs one product and one coefficient. The operations peformed within these circuits is identical to the operations performed in stages 2 through 6 of the pipeline design of FIG. 12 and will not be described in detail. The only inherent advantage the parallel design has over the pipeline is the delay time, from input to output, to process a pixel. However, the processing time for each pixel is longer in the parallel design due to the cascaded adder stages which sum the divisor and dividend terms. The timing in the parallel embodiment is as follows. During the first clock cycle, the counter in the pixel ID and new flag generator is incremented and the pixel ID is formed. During the second clock cycle, the central coefficient is accessed and either it or a 1 is entered into a multiplier along with the central data. At the same time, ROMs in circuits A and B are accessed and the surround coefficients or 0 is stored in multipliers along with the surround data. The six products of data and coefficients are formed during the third cycle. The divisor and dividend are formed in the fourth cycle in the adders and the division operation is done in the fifth and sixth cycles. The parallel design requires 3 more clock cycles than the pipeline design. However, the addition of storage elements to hold intermediate results can decrease the time to compute each pixel at the expense of more hardware.

Thus, methods and hardware implementations of an adaptive convolution process for smoothing image data that was originally compressed with the MAPS algorithm have been disclosed. The required hardware is minimized by utilizing symmetry in organizing the data and coefficients. Also, high speed operation is achieved by the use of specially generated flags and buffering the input data. While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

I claim:

1. A method of smoothing MAPS compressed image data including video data and coefficients for a central block of pixels and video data and coefficients for a plurality of surround areas, said method comprising the steps of:

arranging coefficients for surround areas $CS_1$ through $CS_i$ symmetrically so they are divided into at least two equal groups;

storing the coefficients of one of the equal groups in an order coinciding with the arranging step;

retrieving stored coefficients by accessing the stored coefficients in a first sequence for one of the equal groups and accessing the stored coefficients in an opposite sequence for the other of the equal groups; and utilizing the retrieved coefficients and the video data to calculate the output value for any pixel (n) in the central block of pixels from the equation $$Out_n = \frac{D \cdot C_n + DS_1 \cdot CS_1 + DS_2 \cdot CS_2 + DS_3 \cdot CS_3 \ldots DS_i \cdot CS_i}{C_n + CS_1 + CS_2 + CS_3 \ldots CS_i}$$

Where:
D = video data for the central block,
$C_n$ = coefficient for the central block,
$DS_i$ = video data for the surround areas 1 through i, and
$CS_i$ = coefficient for the surround areas 1 through i; and applying the calculated output value to display apparatus to produce an image from the compressed image data.

2. A method as claimed in claim 1 wherein the storing step includes storing the coefficients in a binary addressable memory and the retrieving step includes generating binary numbers wherein the least significant bits are the address and the most significant bit indicates the equal group being accessed.

3. A method as claimed in claim 1 wherein the storing step includes storing the coefficients in an addressable memory and reducing the amount of memory utilized by dividing the addressable memory into independent sections, dividing the surround areas into groups with each group containing at least two surround areas which are never accessed simultaneously and storing coefficients for the surround areas in each group in a different section of the addressable memory.

4. A method of reducing the amount of memory utilized in storing information, comprising the steps of:

arranging the information symmetrically so it is divided into two equal groups;

storing the information of one of the equal groups in an order coinciding with the arranging step;

retrieving stored information by accessing the stored information in a first sequence for one of the equal groups and accessing the stored information in an opposite sequence for the other of the equal groups.

5. A method as claimed in claim 4 wherein the storing step includes storing the information in an addressable memory, dividing the addressable memory into independent sections, dividing the information into groups with each group containing at least two sets of information which are never accessed simultaneously and storing each group in a different section of the addressable memory.

6. Apparatus for smoothing MAPS compressed image data including video data and coefficients for a central block of pixels and video data and coefficients for a plurality of surround areas, said apparatus comprising:

addressble memory means having stored therein coefficients for the plurality of surround areas, the coefficients being arranged symmetrically so they are divided into two equal groups with the coefficients for one of the equal groups being stored in said memory means;

address generating means connected to said addressable memory means for generating binary numbers the least significant bits of which are the address of the stored coefficient being accessed and the most significant bit of which determines the equal group being accessed: and circuitry connected to said memory means and said address generating means for calculating the output values for any pixel (n) in the central block of pixels from the equation $$Out_n = \frac{D \cdot C_n + DS_1 \cdot CS_1 + DS_2 \cdot CS_2 + DS_3 \cdot CS_3 \ldots DS_i \cdot CS_i}{C_n + CS_1 + CS_2 + CS_3 \ldots CS_i}$$

where:

$D$ = video data for the central block,
$C_n$ = coefficient for the central block,
$DS_i$ = video data for the surround areas 1 through i, and
$CS_i$ = coefficient for the surround areas 1 through i;

7. Apparatus as claimed in claim 6 wherein the addressable memory means further includes a plurality of separately addressable sections, the surround areas are divided into groups with each group containing at least two surround areas which are never accessed simultaneously and coefficients for the surround areas in each group are stored in different sections of said addressable memory.

8. Apparatus as claimed in claim 7 wherein the circuitry includes a stage of apparatus for each group of surround areas and the stages are coupled together to provide continuous processing of the video data.

9. Apparatus as claimed in claim 8 wherein there are twelve surround areas divided into five groups and the circuitry includes a stage for processing the video data and coefficients of the central block and five stages for processing the video data and coefficients of the five groups.

* * * * *